United States Patent
Qiu et al.

(10) Patent No.: US 11,284,473 B2
(45) Date of Patent: Mar. 22, 2022

(54) METHOD AND APPARATUS FOR INTELLIGENT WIFI CONNECTION MANAGEMENT

(71) Applicant: Samsung Electronics Co., Ltd., Suwon-si (KR)

(72) Inventors: Wenxun Qiu, Allen, TX (US); Hao Chen, Plano, TX (US); Matthew Tonnemacher, Allen, TX (US); In-sick Jung, Suwon-si (KR); Jihoon Sung, Suwon-si (KR); Khuong N. Nguyen, College Station, TX (US); Abhishek Sehgal, Richardson, TX (US); Jianhua Mo, Garland, TX (US); Jianzhong Zhang, Plano, TX (US); Junyeop Jung, Yongin-si (KR); John Wensowitch, Dallas, TX (US); Eric Johnson, Santa Clara, CA (US); Namjoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 16/520,152

(22) Filed: Jul. 23, 2019

(65) Prior Publication Data
US 2020/0037392 A1 Jan. 30, 2020

Related U.S. Application Data

(60) Provisional application No. 62/711,170, filed on Jul. 27, 2018, provisional application No. 62/711,207, (Continued)

(51) Int. Cl.
*H04W 76/38* (2018.01)
*H04W 76/10* (2018.01)
(Continued)

(52) U.S. Cl.
CPC ............ *H04W 76/38* (2018.02); *H04L 67/22* (2013.01); *H04W 24/08* (2013.01); *H04W 76/10* (2018.02); *H04W 76/25* (2018.02)

(58) Field of Classification Search
None
See application file for complete search history.

(56) References Cited

U.S. PATENT DOCUMENTS

| 8,570,993 B2 | 10/2013 | Austin et al. |
| 9,131,391 B2 | 9/2015 | Madan et al. |

(Continued)

FOREIGN PATENT DOCUMENTS

| CN | 103561463 A | 2/2014 |
| JP | 2013-530629 A | 7/2013 |
| WO | 2017/167701 A1 | 10/2017 |

OTHER PUBLICATIONS

B. J. Frey, et al., "Clustering by Passing Messages Between Data Points", Science, vol. 315, Feb. 16, 2007, pp. 972-976.
(Continued)

*Primary Examiner* — Saba Tsegaye

(57) ABSTRACT

A method of an electronic device for a connection management is provided. The method comprises: establishing a communication link with an access point (AP); receiving a triggering indication based on link information measured by the electronic device; determining a quality of the communication link between the electronic device and the AP based on the received triggering indication; comparing, based on the determined quality of the communication link, at least two Q values fetched from a Q table that is determined according to context in which in the electronic device is being used; setting a quantized aggressive index (QAI) value based on the compared at least two Q values; and generating a disconnection command based on the QAI value, wherein the disconnection command is a physical disconnection
(Continued)

command or a virtual disconnection command of the communication link between the electronic device and the AP.

20 Claims, 21 Drawing Sheets

Related U.S. Application Data filed on Jul. 27, 2018, provisional application No. 62/760,386, filed on Nov. 13, 2018, provisional application No. 62/768,372, filed on Nov. 16, 2018, provisional application No. 62/799,412, filed on Jan. 31, 2019.

(51) Int. Cl.
    *H04W 24/08*     (2009.01)
    *H04W 76/25*     (2018.01)
    *H04L 67/50*     (2022.01)

(56) References Cited

U.S. PATENT DOCUMENTS

| | | | |
|---|---|---|---|
| 9,232,434 | B2 | 1/2016 | Rong et al. |
| 9,730,029 | B2 | 8/2017 | Choudhury et al. |
| 9,906,992 | B1 | 2/2018 | Youtz et al. |
| 2012/0120839 | A1 | 5/2012 | Liu et al. |
| 2013/0023278 | A1 | 1/2013 | Chin |
| 2014/0243017 | A1 | 8/2014 | Das et al. |
| 2014/0307574 | A1 | 10/2014 | Choi et al. |
| 2015/0281910 | A1 | 10/2015 | Choudhury et al. |
| 2015/0319660 | A1 | 11/2015 | Helbert |
| 2016/0302128 | A1 | 10/2016 | Anchan et al. |
| 2017/0223591 | A1 | 8/2017 | Zalzalah et al. |
| 2018/0132127 | A1 | 5/2018 | Sirotkin et al. |
| 2018/0324607 | A1* | 11/2018 | Rengarajan ........... H04W 24/02 |
| 2019/0150150 | A1* | 5/2019 | Calin ................... H04L 43/026 370/329 |
| 2019/0394700 | A1* | 12/2019 | Lekutai ................ H04W 40/22 |

OTHER PUBLICATIONS

P. Machan, et al., "On the fast BSS transition algorithms in the IEEE 802.11r local area wireless networks", Telecommun. Syst., Sep. 9, 2011, pp. 2713-2720.

K. Cho, et al., "Learning Phrase Representations using RNN Encoder-Decoder for Statistical Machine Translation", arXiv preprint arXiv:1406.1078, Sep. 3, 2014, 15 pages.

Z. C. Lipton, et al., "A Critical Review of Recurrent Neural Networks for Sequence Learning", arXiv preprint arXiv: 1506.00019, Oct. 2015, 38 pages.

S. Hochreiter, et al., "Long Short-Term Memory", Neural Computation 9(8):1735-1750, 1997, 32 pages.

X. Zhang, et al., "Data Stream Clustering with Affinity Propagation", IEEE Transactions on Knowledge and Data Engineering, vol. 26, No. 7, 2014, pp. 1644-1656.

R. Sutton, et al., "Reinforcement Learning: An Introduction", the MIT Press, Nov. 5, 2017, 445 pages.

V. Mhatre, et al., "Using Smart Triggers for Improved User Performance in 802.11 Wireless Networks", MObiSys' 06, Uppsala, Sweden, Jun. 19-22, 2006, pp. 246-259.

F. Rosenblatt, "The perceptron, a perceiving and recognizing automaton", (Project Para) Cornell Aeronautical Laboratory, 1957, 33 pages.

R. Razavi, et al., "A Fuzzy Reinforcement Learning Approach for Self-Optimization of Coverage in LTE Networks", Bell Labs Technical Journal, 15(3), pp. 153-176.

International Search Report dated Oct. 28, 2019 in connection with International Patent Application No. PCT/KR2019/009435, 3 pages.

Written Opinion of the International Searching Authority dated Oct. 28, 2019 in connection with International Patent Application No. PCT/KR2019/009435, 5 pages.

Supplementary European Search Report dated Jul. 9, 2021 in connection to European Patent Application No. 19840657.1, 10 pages.

\* cited by examiner

METHOD AND APPARATUS FOR INTELLIGENT WIFI CONNECTION MANAGEMENT

CROSS-REFERENCE TO RELATED APPLICATION(S) AND CLAIM OF PRIORITY

The present application claims priority to:
U.S. Provisional Patent Application Ser. No. 62/711,207 filed on Jul. 27, 2018;
U.S. Provisional Patent Application Ser. No. 62/711,170 filed on Jul. 27, 2018;
U.S. Provisional Patent Application Ser. No. 62/760,386 filed on Nov. 13, 2018;
U.S. Provisional Patent Application Ser. No. 62/768,372 filed on Nov. 16, 2018; and
U.S. Provisional Patent Application Ser. No. 62/799,412 filed on Jan. 31, 2019.
The content of the above-identified patent documents is incorporated herein by reference.

TECHNICAL FIELD

The present disclosure relates generally to a user centric WiFi connection management scheme to track a user preference on WiFi disconnection by learning from user's behavior.

BACKGROUND

A communication system includes a downlink (DL) that conveys signals from transmission points such as access points (APs), base stations (BSs) or eNodeBs to user equipments (UEs) or stations (STAs) and an uplink (UL) that conveys signals from STAs to reception points such as APs. A STA, also commonly referred to as a terminal or a mobile station, may be fixed or mobile and may be a cellular phone, a personal computer device, etc. An AP, which is generally a fixed station, may also be referred to as an access point or other equivalent terminology.

SUMMARY

Embodiments of the present disclosure provide methods and apparatuses for a user centric WiFi connection management scheme to track a user preference on WiFi disconnection by learning from user's behavior.

In one embodiment, an apparatus for a connection management of an electronic device is provided. The apparatus comprises a transceiver configured to establish a communication link with an access point (AP). The apparatus further comprises a processor operably connected to the transceiver, the processor configured to: receive a triggering indication based on link information measured by the electronic device; determine a quality of the communication link between the electronic device and the AP based on the received triggering indication; compare, based on the determined quality of the communication link, at least two Q values fetched from a Q table that is determined according to context in which in the electronic device is being used; set a quantized aggressive index (QAI) value based on the compared at least two Q values; and generate a disconnection command based on the QAI value, wherein the disconnection command is a physical disconnection command or a virtual disconnection command of the communication link between the electronic device and the AP.

In another embodiment, a method of an electronic device for a connection management is provided. The method comprises establishing a communication link with an access point (AP); receiving a triggering indication based on link information measured by the electronic device; determining a quality of the communication link between the electronic device and the AP based on the received triggering indication; comparing, based on the determined quality of the communication link, at least two Q values fetched from a Q table that is determined according to context in which in the electronic device is being used; setting a quantized aggressive index (QAI) value based on the compared at least two Q values; and generating a disconnection command based on the QAI value, wherein the disconnection command is a physical disconnection command or a virtual disconnection command of the communication link between the electronic device and the AP.

In yet another embodiment, a non-transitory computer-readable medium comprising program code, that when executed by at least one processor, is provided to causes an electronic device to: establish a communication link with an access point (AP); receive a triggering indication based on link information measured by the electronic device; determine a quality of the communication link between the electronic device and the AP based on the received triggering indication; compare, based on the determined quality of the communication link, at least two Q values fetched from a Q table that is determined according to context in which in the electronic device is being used; set a quantized aggressive index (QAI) value based on the compared at least two Q values; and generate a disconnection command based on the QAI value, wherein the disconnection command is a physical disconnection command or a virtual disconnection command of the communication link between the electronic device and the AP.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
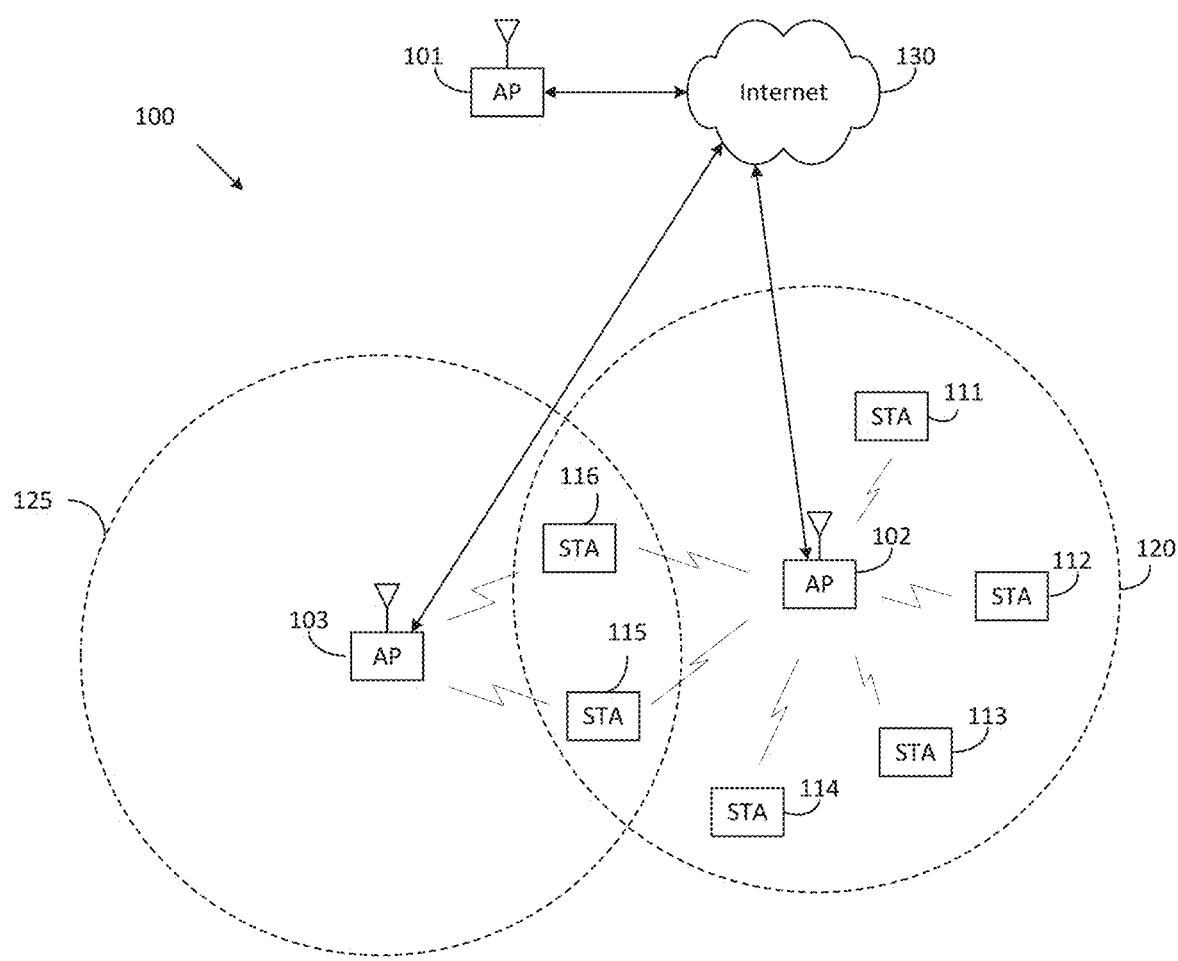
FIG. 1 illustrates an example wireless network according to embodiments of the present disclosure.

FIG. 1 through FIG. 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Depending on the network type, the term "base station" or "BS" can refer to any component (or collection of components) configured to provide wireless access to a network, such as transmit point (TP), transmit-receive point (TRP), an enhanced base station (eNodeB or eNB or gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "AP" and "BS" are used interchangeably in this disclosure document to refer to the network infrastructure components that provide wireless access to remote terminals.

Also, depending on the network type, the term "station" or "STA" or "user equipment" or "UE" can refer to any component such as "mobile station," "subscriber station," "remote terminal," "wireless terminal," "receive point," or "user device." For the sake of convenience, the terms "station" and "STA" are used in this disclosure to refer to remote wireless equipment that wirelessly accesses an AP, whether the STA is a mobile device (such as a mobile telephone or smartphone) or is normally considered a stationary device (such as a desktop computer or vending machine). The term "distribution nodes" or "DN"s is referred to a class of APs that provide backhaul links to the wireless network. The term "client nodes" or "CN"s is referred in a class of APs that engage with the DNs over wireless links to further provide wireless service to the UEs or STAs. The term "short range devices" or "SRD"s refer to the devices employing a wireless technology to carry out data transfer over a wireless link with relatively short physicals distance.

Figure 2:
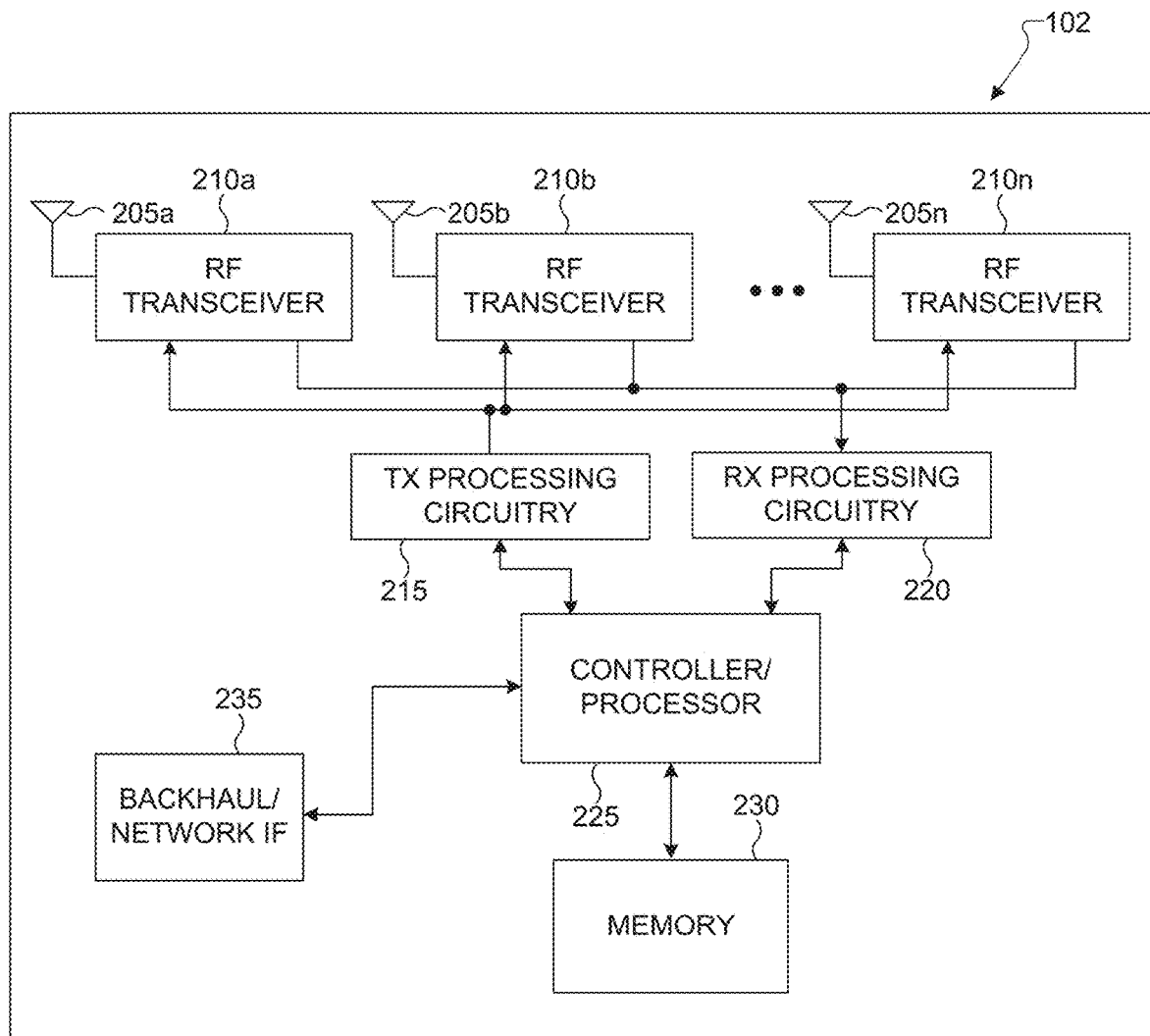
FIG. 2 illustrates an example AP according to embodiments of the present disclosure.
Figure 3:
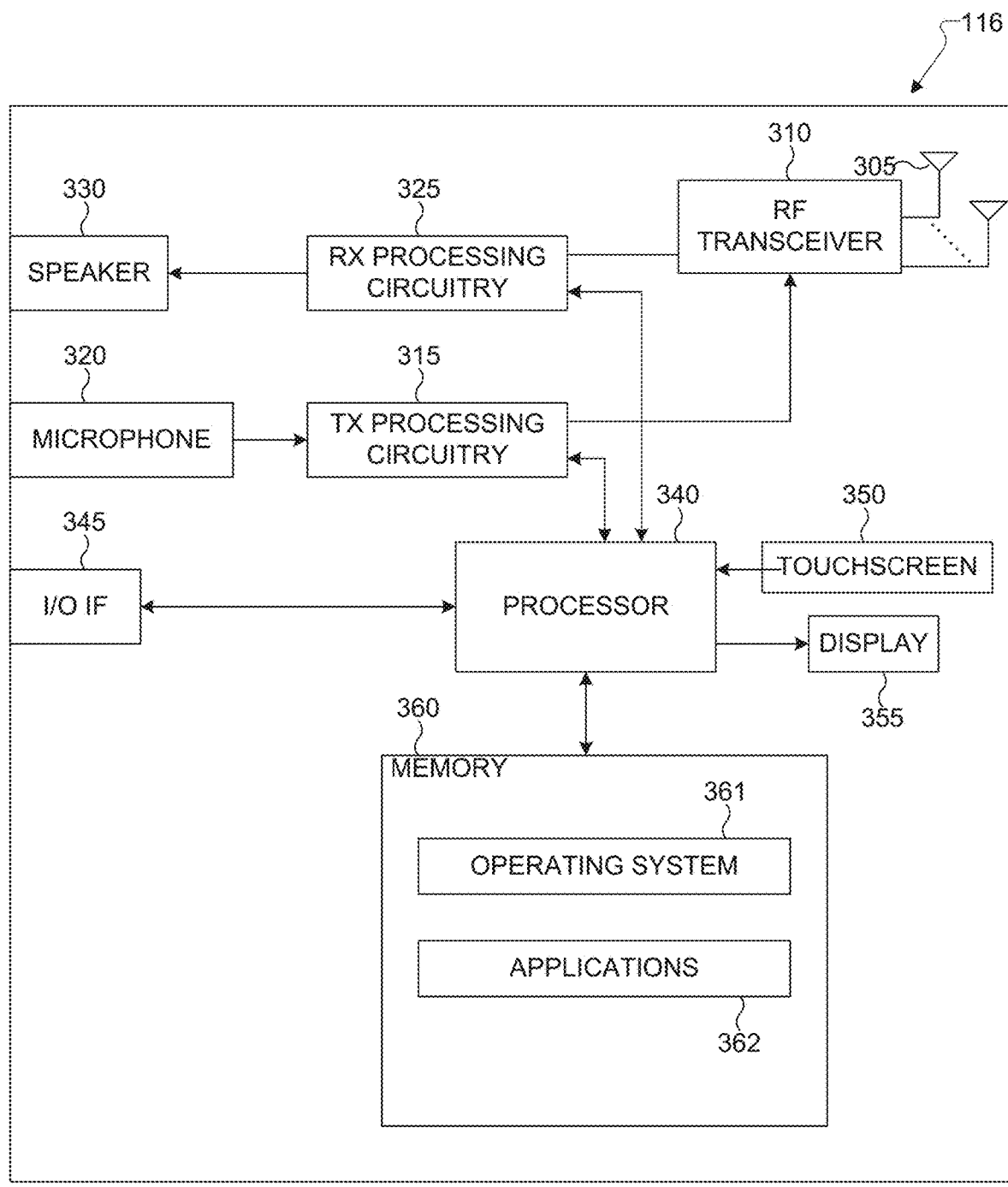
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an AP 101, an AP 102, and am AP 103. The AP 101 communicates with the AP 102 and the AP 103. The AP 101 also communicates with at least one network 130, such as the Internet, a proprietary Internet Protocol (IP) network, or other data network.

The AP 102 provides wireless broadband access to the network 130 for a first plurality of user equipments (UEs) within a coverage area 120 of the AP 102. The first plurality of STAs includes a STA 111, which may be located in a small business (SB); a STA 112, which may be located in an enterprise (E); a STA 113, which may be located in a WiFi hotspot (HS); a STA 114, which may be located in a first residence (R); a STA 115, which may be located in a second residence (R); and a STA 116, which may be a mobile device (M), such as a cell phone, a wireless laptop, a wireless PDA, or the like. The AP 103 provides wireless broadband access to the network 130 for a second plurality of UEs within a coverage area 125 of the AP 103. The second plurality of STAs includes the STA 115 and the STA 116. In some embodiments, one or more of the APs 101-103 may communicate with each other and with the APs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the STAs 111-116 include circuitry, programming, or a combination thereof, for efficient connection management in an advanced wireless communication system. In certain embodiments, and one or more of the APs 101-103 includes circuitry, programming, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs (e.g., access point (AP)) and any number of UEs (e.g., station (STA)) in any suitable arrangement. Also, the access point 101 could communicate directly with any number of stations and provide those stations (STAs) with wireless broadband access to the network 130. Similarly, each AP 102-103 could communicate directly with the network 130 and provide STAs with direct wireless broadband access to the network 130. Further, the APs 101, 102, and/or 103 could provide access to other or additional external networks, such as external telephone networks or other types of data networks.

FIG. 2 illustrates an example access point (AP) 102 according to embodiments of the present disclosure. The embodiment of the AP 102 illustrated in FIG. 2 is for illustration only, and the APs 101 and 103 of FIG. 1 could have the same or similar configuration. However, APs come in a wide variety of configurations, and FIG. 2 does not limit the scope of this disclosure to any particular implementation of an AP.

As shown in FIG. 2, the AP 102 includes multiple antennas 205a-205n, multiple RF transceivers 210a-210n, transmit (TX) processing circuitry 215, and receive (RX) processing circuitry 220. The AP 102 also includes a controller/processor 225, a memory 230, and a backhaul or network interface 235.

The RF transceivers 210a-210n receive, from the antennas 205a-205n, incoming RF signals, such as signals transmitted by STAs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the AP 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the AP 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the AP 102 to communicate with other devices or systems over a backhaul connection or over a network. The interface 235 could support communications over any suitable wired or wireless connection(s). For example, when the AP 102 is implemented as part of a cellular communication system (such as one supporting 5G, LTE, or LTE-A), the interface 235 could allow the AP 102 to communicate with other APs over a wired or wireless backhaul connection. When the AP 102 is implemented as an access point, the interface 235 could allow the AP 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of AP 102, various changes may be made to FIG. 2. For example, the AP 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the AP 102 could include multiple instances of each (such as one per RF transceiver). Also, various components in FIG. 2 could be combined, further subdivided, or omitted and additional components could be added according to particular needs.

FIG. 3 illustrates an example STA 116 according to embodiments of the present disclosure. The embodiment of the UE 116 illustrated in FIG. 3 is for illustration only, and the STAs 111-115 of FIG. 1 could have the same or similar configuration. However, STAs come in a wide variety of configurations, and FIG. 3 does not limit the scope of the present disclosure to any particular implementation of a STA.

As shown in FIG. 3, the STA 116 includes an antenna 305, a radio frequency (RF) transceiver 310, TX processing circuitry 315, a microphone 320, and receive (RX) processing circuitry 325. The STA 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an AP of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from an AP or an operator. The processor 340 is also coupled to the I/O interface 345, which provides the STA 116 with the ability to connect to other devices, such as laptop computers and handheld computers. The I/O interface 345 is the communication path between these accessories and the processor 340.

The processor 340 is also coupled to the touchscreen 350 and the display 355. The operator of the STA 116 can use the touchscreen 350 to enter data into the STA 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of STA 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the STA 116 configured as a mobile telephone or smartphone, STAs could be configured to operate as other types of mobile or stationary devices.

IEEE 802.11ay standards has currently included the use case for providing internet service to buildings (residential/commercial/etc.) through wireless backhaul (or fixed wireless access). In addition, the E-UTRAN supports relaying by having a relay node (RN) or relay base station (BS) or distribution node (DN) in the case of 802.11ay, wirelessly connect to an eNB or DN serving the RN, called donor eNB (DeNB) or donor BS or fiber DN (FDN). For NG-RAN, wireless backhaul link or network support is expected to be a part of the Release-16 of the new radio (NR) standards The wireless backhaul link is also supported as a use case in the most recent IEEE 802.11ay networks.

The operating frequency band for wireless backhaul link or network can be in ultra high frequency (UHF) (300 MHz-3 GHz), super high frequency (SHF) (3 GHz-30 GHz) or extremely high frequency (EHF) (30-300 GHz). Wireless backhaul link or network can be based on radio technology such as IEEE 802.11ac, 802.11ax, 802.11ad and 802.11ay.

Figure 4:
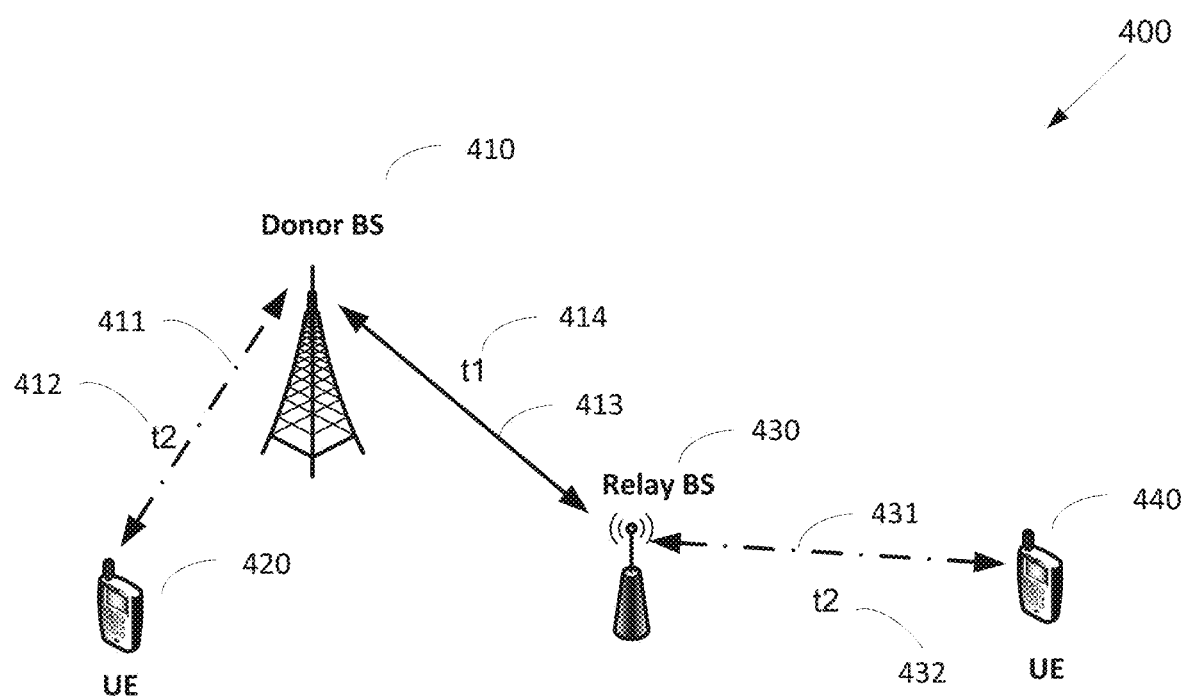
FIG. 4 illustrates an example wireless network with relay BS (EUTRAN) according to embodiments of the present disclosure.

FIG. 4 illustrates an example wireless network with relay BS (EUTRAN) 400 according to embodiments of the present disclosure. The embodiment of the wireless network with relay BS (EUTRAN) 400 illustrated in FIG. 4 is for illustration only. FIG. 4 does not limit the scope of the present disclosure to any particular implementation.

Referring to FIG. 4, a RN 430 is wirelessly connected to an eNB serving the RN, called donor eNB (DeNB) or donor BS 410, via the Un interface 413, which is also be referred to as the backhaul for the RN. The RN supports the eNB functionality, i.e. it terminates the radio protocols of the E-UTRA radio interface, and the S1 and X2 interfaces. In addition to the eNB functionality, the RN also supports a subset of the UE functionality, e.g., physical layer, layer-2, RRC, and NAS functionality, in order to wirelessly connect to the DeNB. A UE can be served directly by the DeNB, such as UE 420, or it can be served by a RN, such as UE 440. For in-band relay operation, the wireless backhaul link 413 for the RN and the wireless access links 411, 431 for the DeNB and the RN share the same frequency band.

The present disclosure provides an intelligent Wi-Fi connection (IWC) circuit (e.g., module), which uses machine learning method to track the user preference (aggressiveness) on Wi-Fi link disconnection and generate the corresponding Wi-Fi link disconnection command. Here, the disconnection can be a real WiFi link disconnection or a virtual disconnection. Virtual disconnection means the terminal uses other data link (e.g., cellular data) while keep the WiFi connection. Therefore in virtual disconnection case, WiFi link connection is still maintained, but the terminal just does not use it.

Intelligent Wi-Fi Connection Circuit (e.g., Module).

Figure 5:
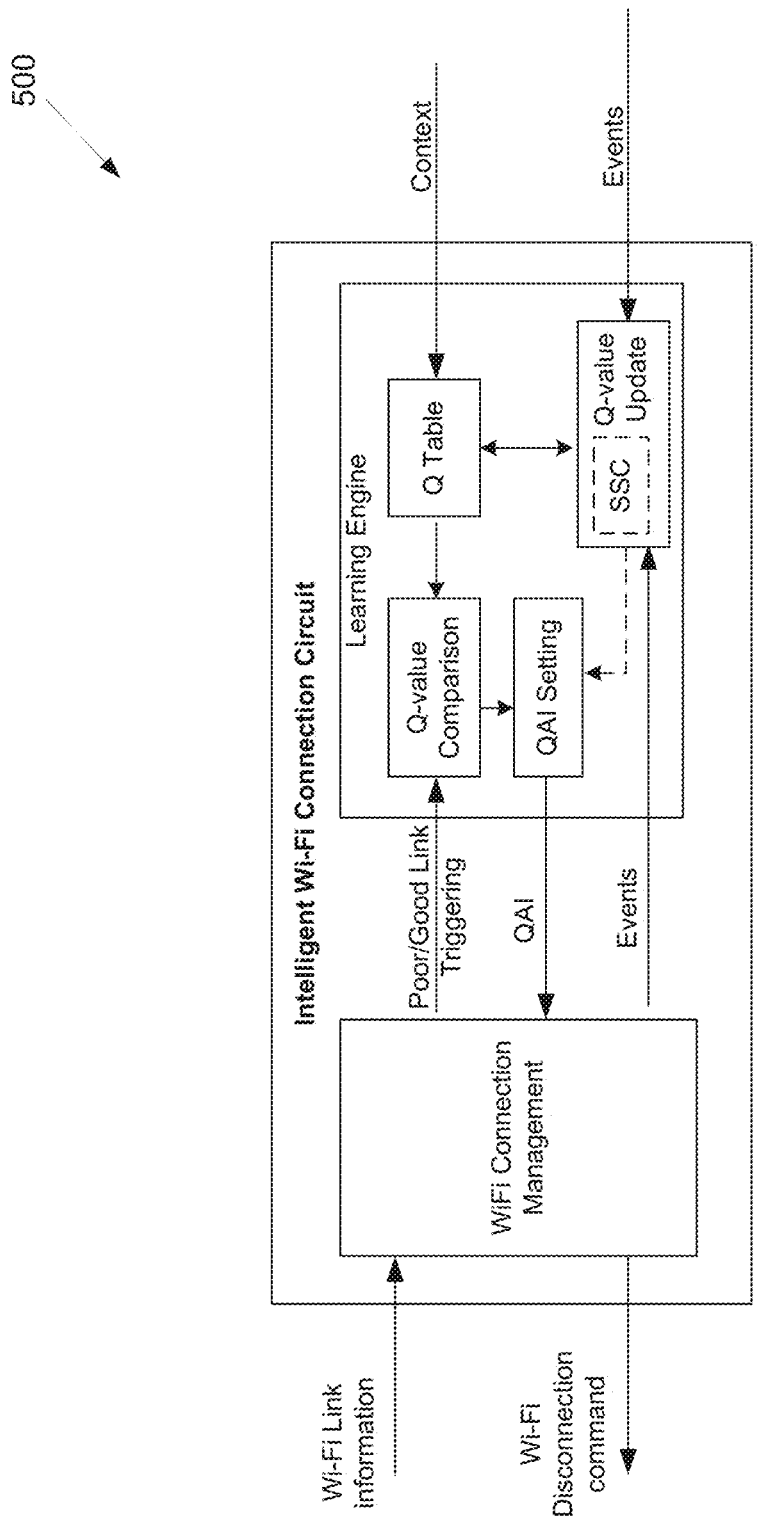
FIG. 5 illustrates an example intelligent Wi-Fi connection circuit according to embodiments of the present disclosure.

FIG. 5 illustrates an example intelligent Wi-Fi connection circuit 500 according to embodiments of the present disclosure. The embodiment of the intelligent Wi-Fi connection circuit 500 illustrated in FIG. 5 is for illustration only. FIG. 5 does not limit the scope of the present disclosure to any particular implementation.

As shown in FIG. 5, IWC circuit (e.g., module) takes Wi-Fi link (L1/L2/L3 layers) information, rewards events and contexts as input, and generates Wi-Fi disconnection command as output.

The IWC circuit 500 includes two sub-modules (e.g., sub-circuit), WiFi connection management (WCM) and learning engine. The learning engine is the core circuit (e.g., module), which is in charge of learning and tracking user preference on the Wi-fi disconnection. A WCM mainly maps Wi-Fi link information into discrete states and maps QAI into comprehensive Wi-Fi link level threshold for disconnection. With the translation by WCM, learning engine can work on an abstracted model.

WiFi Connection Management Sub-Circuit (e.g., Module).

Figure 6:
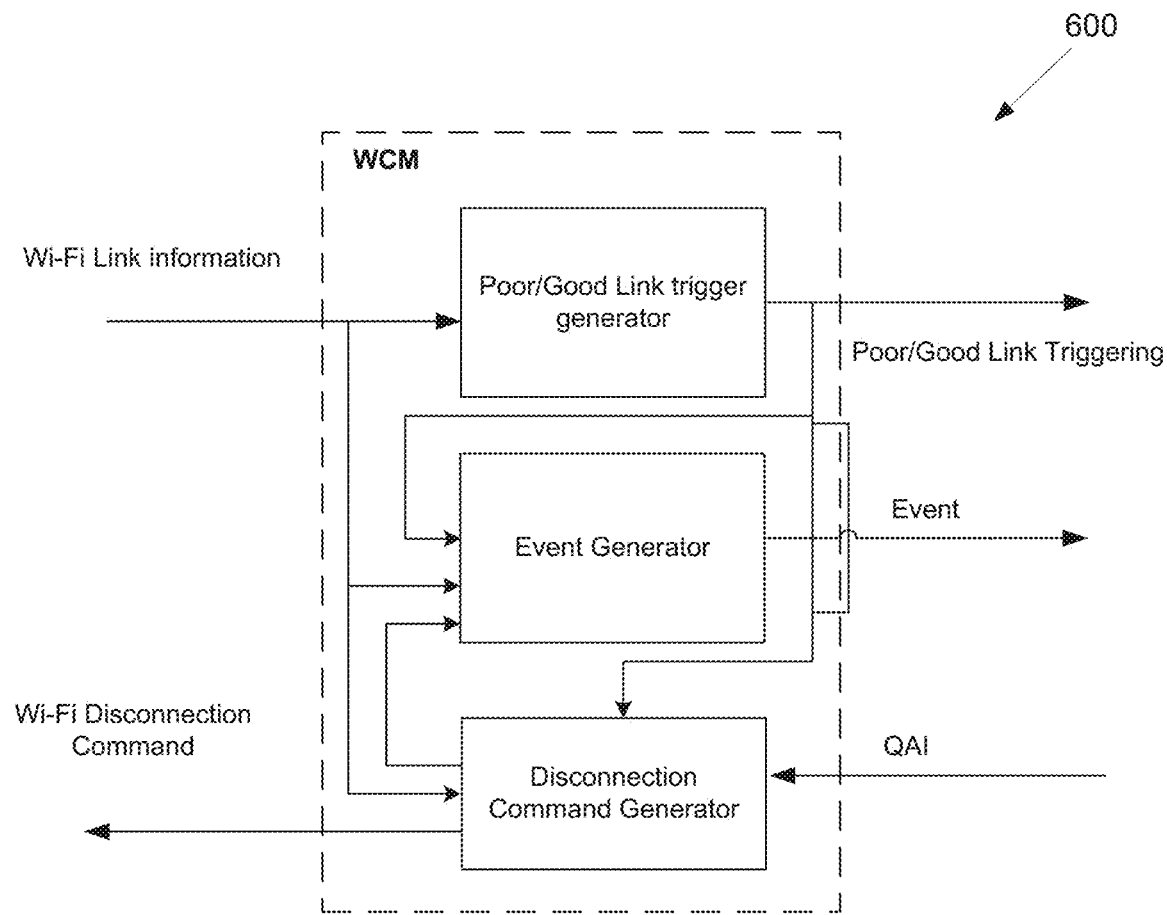
FIG. 6 illustrates an example WCM block diagram according to embodiments of the present disclosure.

FIG. 6 illustrates an example WCM block diagram 600 according to embodiments of the present disclosure. The embodiment of the WCM block diagram 600 illustrated in FIG. 6 is for illustration only. FIG. 6 does not limit the scope of the present disclosure to any particular implementation.

As shown in FIG. 6, the WCM mainly performs 3 roles: 1. abstract the link information to generate poor/good link triggering; 2. translate QAI into comprehensive link parameter thresholds and generate Wi-Fi disconnection; and 3. generate reward events according to WiFi connection status.

A Poor/Good Link Trigger Generator (PGLTG).

A PGLTG uses the Wi-Fi link information to decide whether current link is good or bad. The Wi-Fi link information includes (but not limited to) CAP's BSSID, SSID, RSSI, number of bad TX packets, number of beacon loss, number of re-transmissions, etc. Once the poor link condition is met, the poor link triggering may be generated. Afterwards, the condition is checked for every time unit (i.e., 1 second). If the poor link condition is still met, additional poor link triggering would be generated. Once the poor link is not met, the good link triggering is generated. The good link triggering is generated only once after leaving the poor link condition. A second good link triggering needs to wait until next time it leaves poor link conditions. All poor/good link trigger generating conditions are conditioning on connecting to same AP.

In one embodiment, if the number of bad TX packets in 1 second is more than $N_b$, then poor link triggering is generated. After the poor link, if still connected to same AP, at the first second that the number of bad TX packets is no more than $N_b$, good link triggering is generated.

Disconnection Command Generator (DCG).

There is an important concept here: quantized aggressiveness index (QAI). QAI maps the user aggressiveness on Wi-Fi disconnection into several quantized level ($I_Q$ level). For ease of description, it may be assumed that QAI=1 provides the most aggressive disconnection setting, and QAI=$I_Q$ provides the least aggressive QAI setting. The different QAI levels can be defined by different number of consecutive poor link triggering and/or Wi-Fi link information. The number of consecutive poor link triggering is also equivalent to the duration ($T_p$) from the first poor link triggering (or the first poor link triggering after the last good link triggering) to the time of checking. If there is a good link triggering, $T_p$ is reset.

In one embodiment, it is defined that QAI=i, i=1, ..., $I_Q$, as $N_i$ consecutive poor link triggering. If QAI=i, then once meeting $N_i$ consecutive poor link triggering, DCG module would generate Wi-Fi disconnection command. One example is that I=3, and $N_i=\{2,15,+\infty\}$. Here, $+\infty$ means DCG module never generates disconnection command. Disconnection would be generated by other modules, e.g., Wi-Fi driver. Here, QAI=1 is the most aggressive setting and QAI=3 is the least aggressive setting.

In one example of event generator, the event generator takes poor/good link triggering, disconnection command and Wi-Fi link information as inputs to generate predefined events. Those events would be used in learning engine.

Events.

Events are used to train the learning engine. 4 types of events are defined: more aggressive event (M event), less aggressive event (L event), neutral event (N event) and special event (S event). Additionally, it may be defined that a concept is called "edge." If the time to last poor link (no matter there is a good link triggering or not) is within $T_e$, it may be defined that this STA is in the "edge" region. It may be defined that "switch flag" which indicates the virtual disconnection happens or not ("On" corresponds to virtual disconnection). Note that in virtual disconnection, once some condition (e.g., WiFi link RSSI value is higher than a predefined threshold) is met, the terminal could go back to use original Wi-Fi link. In this case, switch flag would be turned off once the switch flag goes back to WiFi link.

M event indicates users want more aggressive disconnection setting than current setting. In learning engine, M event would lead to positive reward to more aggressive QAI setting. L event indicates users want less aggressive disconnection setting then current setting. In learning engine, L event would lead to positive reward to less aggressive QAI setting.

N event indicates users have no complaint on current disconnection setting. In learning engine, N event would lead to positive rewards to current QAI setting.

S event is a special event. For these events, a predefined QAI setting would be used instead of learning engine. For example, the event of user inside an elevator and elevator door is closed. This event can directly trigger most aggressive QAI setting.

For real Wi-Fi disconnection and virtual Wi-Fi disconnection, the events could be different.

Events for Real Wi-Fi Disconnection.

In one embodiment, for real Wi-Fi disconnection, M events include following events: user disconnects WiFi at the edge region; user switches from one AP to the other AP at the edge region; User turns off Wi-Fi at the edge region; user turns on any aggressive setting or turn off any conservative setting (e.g., turning on "smart network switch" mode or aggressive "smart network switch" mode, etc.); and any other event indicating user wants more aggressive setting.

In one embodiment, for real Wi-Fi disconnection, L event includes following events: user turns off cellular data service at the edge; Wi-Fi connection is disconnected by phone (IWC or other module), but user manually reconnects to the same AP; after connected to AP, the connection is disconnected by phone within time $T_d$; user turns off any aggressive setting or turn on any conservative setting (e.g., turning off "smart network switch" mode or aggressive "smart network switch" mode, etc.); and any other event indicating user wants less aggressive setting.

In one embodiment, for real Wi-Fi disconnection, N events include following events: Wi-Fi connection is disconnected by phone (the connection is maintained more than $T_d$); and Keep connection.

In one embodiment, for real Wi-Fi disconnection, S events include following events: user turns on Wi-Fi when the phone is in flight mode; and user turns off cellular data at non-edge region.

Events for Virtual Wi-Fi Disconnection.

In one embodiment, for virtual Wi-Fi disconnection, M events include following events: user disconnects WiFi at edge region or when switch flag is on; user switches from one AP to the other AP at the edge region but switch flag is off; user turns off Wi-Fi at the edge region or when switch flag is on; user turns on any aggressive setting or turn off any conservative setting (e.g., turning off "smart network switch" mode or aggressive "smart network switch" mode, etc.; and any other event indicating user wants more aggressive setting.

In one embodiment, for virtual Wi-Fi disconnection, L events include following events: user turns off cellular data service at the edge or when switch flag is off; Wi-Fi connection is disconnected by phone (IWC or other module), but user manually reconnects to the same AP; user switches from one AP to the other AP at the edge region and switch flag is on; after connected to AP, the connection is disconnected (either real or virtual) by phone within time $T_d$; user turns off any aggressive setting or turn on any conservative setting (e.g., turning off "smart network switch" mode or aggressive "smart network switch" mode, etc.); and any other event indicating user wants less aggressive setting.

In one embodiment, for virtual Wi-Fi disconnection, N event includes following events: Wi-Fi connection is disconnected (either real or virtual) by phone (the connection is maintained more than $T_d$); and Keep connection.

In one embodiment, for virtual Wi-Fi disconnection, S event includes following events: user turns on Wi-Fi when the phone is in flight mode; user turns off cellular data at non-edge region; and it is detected that user is inside the elevator and the door is closed.

Context.

The learning is based on contexts. Learning engine tracks user preference per context, and for each context an individual table is maintained to tracking the user preference on the aggressiveness of disconnection.

The context is a combination of different information. The information can include CAP BSSID, direction information (e.g., away from AP, towards AP, steady), location information (location index for the zone within CAP's coverage), in-car flag, in-elevator flag, etc. The different combinations of the context finally map to a unique context index c.

Learning Engine.

Learning engine is the core to learn and track the user preference on the aggressiveness of Wi-Fi disconnection. The engine has two functions: action and learning. Both action and learning are per context. Action and learning processes are asynchronized. These two processes work individually and connect with each other by Q table.

A Q table is used to track the user preference. A learning process is to update the Q table so that the learning process can reflect user updated preference on aggressiveness of Wi-Fi disconnection. Action process is to use the Q table and map the Q value in Q table into real actions. Each QAI level maps an entry in Q table, called as state. Thus there are totally $I_Q$ states in each Q table. Each state has its own value called Q value in each Q table.

Learning Process.

Figure 7:
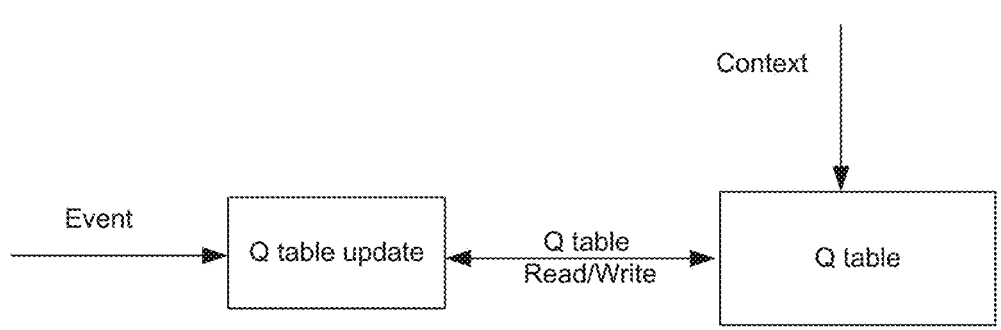
FIG. 7 illustrates an example learning process according to embodiments of the present disclosure.

FIG. 7 illustrates an example learning process 700 according to embodiments of the present disclosure. The embodiment of the learning process 700 illustrated in FIG. 7 is for illustration only. FIG. 7 does not limit the scope of the present disclosure to any particular implementation.

As shown in FIG. 7, the learning process is triggered by events. Once an event triggers learning process to run, a Q table is read according to the input context. A Q table update module would update the corresponding Q value and then write it back to the Q table module.

$Q_{c,n}(s)$ is used to represent the Q value of state s at Q table for context c, where s is the index of state (corresponding to QAI level), c is the index of context and n is the event sequence. For each M event or L event, Q value is updated as given by equations (1) and (2):

$$Q_{c,n+1}(s) = \alpha_1 Q_{c,n}(s) + \gamma R_e(s), s = 1, 2, \ldots, I_Q \quad (1)$$

$$R_e(s) = \begin{cases} R_e \beta^{s-s_0-1}, s > s_0 \text{ and } s_0 < I_Q \text{ at } L \text{ event} \\ R_e, s = I_Q \text{ and } s_0 = I_Q \text{ at } L \text{ event} \\ R_e \beta^{s_0-s-1}, s < s_0 \text{ and } s_0 > 1 \text{ at } M \text{ event} \\ R_e, s = 1 \text{ and } s_0 = 1 \text{ at } M \text{ event} \\ 0, \text{ else} \end{cases} \quad (2)$$

In equation (1) and (2), $\alpha_1$ is the learning rate in time domain for M or L event (e.g., $\alpha_1$=0.8). $\gamma$ is reward discount factor (e.g., $\gamma$=1). $\beta$ is reward discount factor (e.g., $\beta$=0.8). $R_e(s)$ is the rewards at state s for event e. $R_e$ is the reward value of event e, which is a predefined value for each event. $s_0$ is current state or QAI value. Note that for M events and L event, all the entries in the Q table for context c are updated.

In one embodiment, it is defined that $\alpha_1$=0.8, $\gamma$=1, $\beta$=0.8, $R_e$=1. For example, for N event, Q value is updated as given by equation (3):

$$Q_{c,n+1}(s_0) = \alpha_2 Q_{c,n}(s_0) + R_e \quad (3)$$

In equation (3), $\alpha_2$ is the learning rate in time domain for N event. For N event, only the entry in the Q table (corresponding to context c) for current QAI setting is updated.

In one embodiment, it is defined that $\alpha_2$=0.98, $R_e$=0.1.

Action Process.

Figure 8:
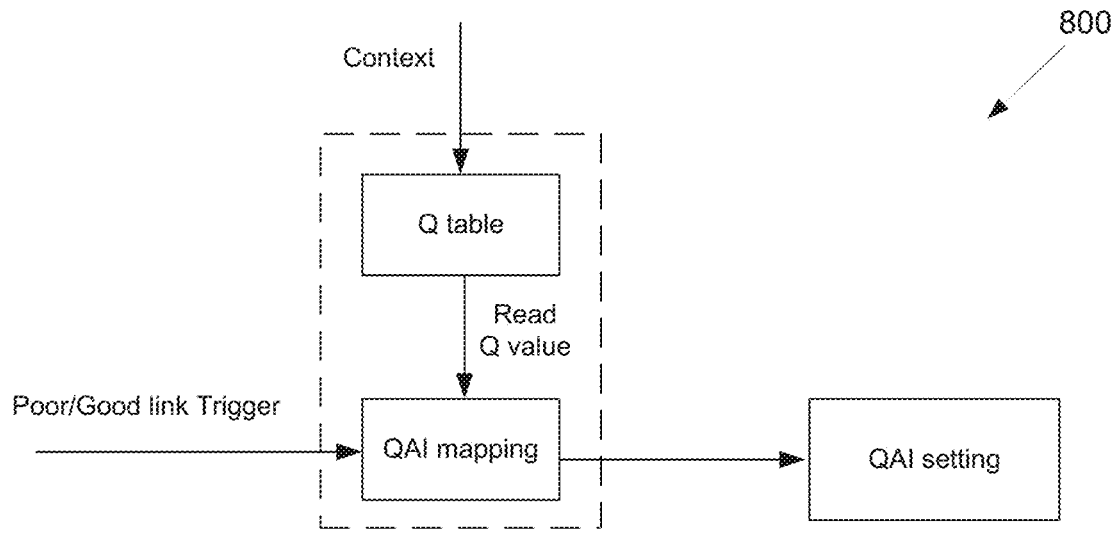
FIG. 8 illustrates an example action process according to embodiments of the present disclosure.

FIG. 8 illustrates an example action process 800 according to embodiments of the present disclosure. The embodiment of the action process 800 illustrated in FIG. 8 is for illustration only. FIG. 8 does not limit the scope of the present disclosure to any particular implementation.

As shown in FIG. 8, the action process 8000 is triggered by poor/good link triggering. After triggering, depending on the type of triggering, different action is taken. For poor link triggering, Q table for the current context is read. QAI mapping sub-module (e.g., circuit) would find the right QAI value from the Q table. And then write the QAI value into WCM module and set QAI into true. For good link triggering, QAI is written to false directly.

Figure 9:
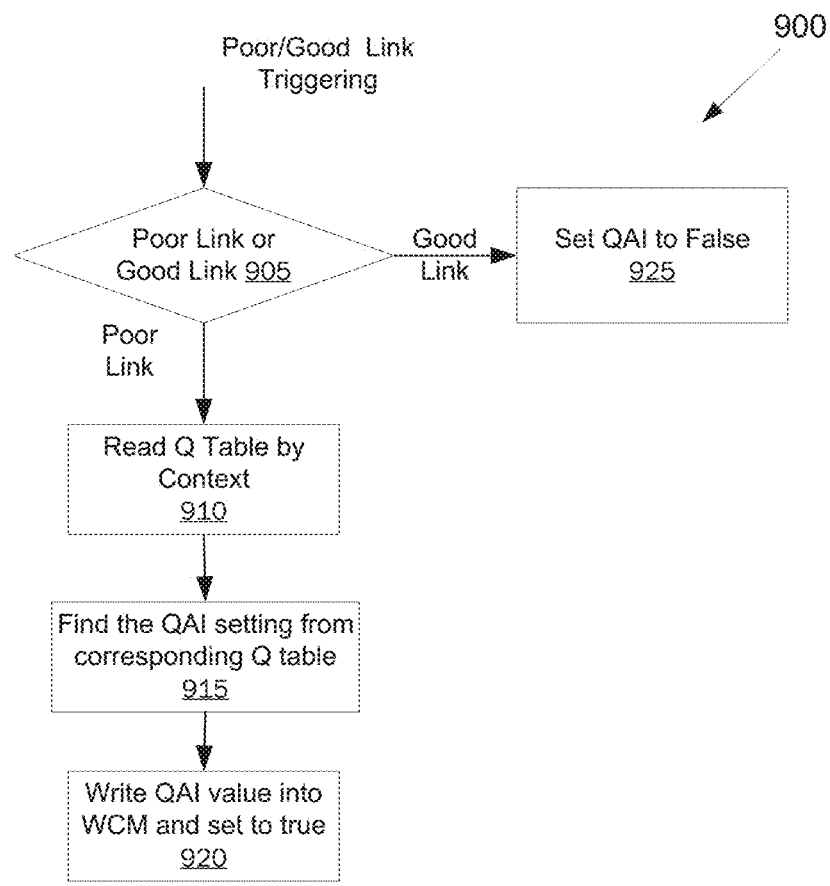
FIG. 9 illustrates a flow chart of a method for an action process according to embodiments of the present disclosure.

FIG. 9 illustrates a flow chart of a method 900 for an action process according to embodiments of the present disclosure. The embodiment of the method 900 illustrated in FIG. 9 is for illustration only. FIG. 9 does not limit the scope of the present disclosure to any particular implementation.

As illustrated in FIG. 9, the method 900 determines, at step 905, a link is a poor link or good link. The method 900 sets QAI to false in step 925 if the good link is determined in step 905. In step 910 the method 900 reads Q table by context when the link is determined as the poor link in step 905. In step 915, the method 900 finds the QAI setting from corresponding Q table. The method in step 920 writes QAI value into WCM and sets to true.

For QAI mapping sub-module (e.g., circuit), one embodiment is to select the QAI with the maximal Q value given by equation (4):

$$QAI = \underset{s}{\mathrm{argmax}}(Q_c(s)) \quad (4)$$

In another embodiment, QAI mapping is provided to introduce hysteresis into the QAI value selection as given by equation (5):

$$QAI = \begin{cases} s_E, \text{ if } \underset{s_i, s_i \neq s_E}{\max}(Q_c(s_i)) \leq Q_c(s_E) + H \\ \underset{s_i, s_i \neq s_E}{\max}(Q_c(s_i)), \text{ if } \underset{s_i, s_i \neq s_E}{\max}(Q_c(s_i)) > Q_c(s_E) + H \end{cases} \quad (5)$$

where $s_E$ is the current state or effective QAI, and H is a predefined constant.

In another embodiment, QAI mapping is provided to use hysteresis as well. But the hysteresis is only applied to part of the states as given by:

$$QAI = \begin{cases} \underset{s_i}{\mathrm{argmax}}(Q_c(s_i)), \text{ if } s_E = 2, \ldots, I_Q - 1 \\ \underset{s_i, s_E}{\mathrm{argmax}}(Q_c(s_i), Q_c(s_E) + H), \text{ if } s_E = 1, I_Q \end{cases}.$$

Steady State Checking (SSC).

Figure 10:
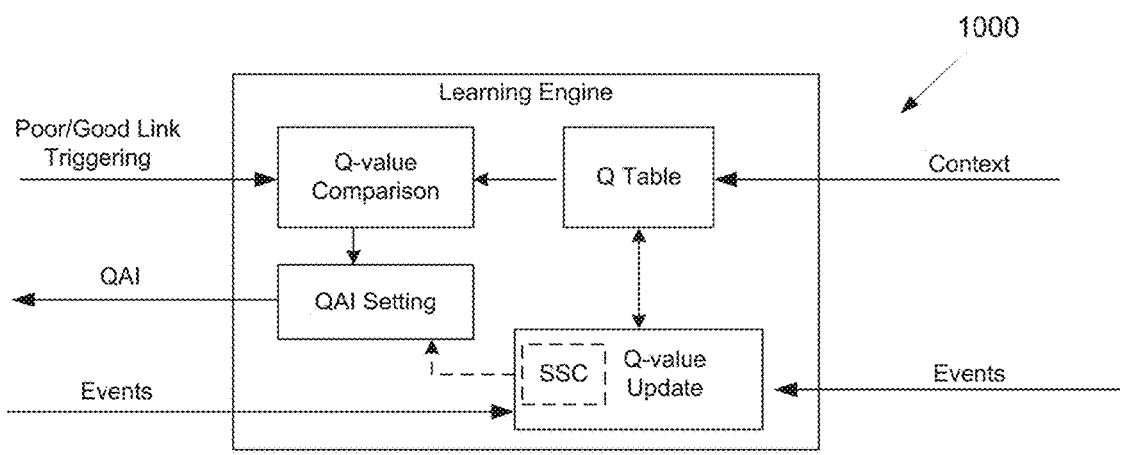
FIG. 10 illustrates an example steady state checking according to embodiments of the present disclosure.

A steady state checking (SSC) function is an optional function, which analyzes the history of the events and generates the steady state triggering event, as shown in FIG. 10. If the steady state is false, the QAI setting module (e.g., circuit) could be disabled. If the steady state is true, then the QAI setting module (circuit) is functioning as normal.

FIG. 10 illustrates an example steady state checking 1000 according to embodiments of the present disclosure. The embodiment of the steady state checking 1000 illustrated in FIG. 10 is for illustration only. FIG. 10 does not limit the scope of the present disclosure to any particular implementation.

The Condition of Turning State.

State true can be defined by the history of the events. There are 3 different cases.

In one embodiment of case 1 for straight L events or M events (There is no other event among L or M event), L events or M events happen straightly without any other event among L or M event. X is provided to denote the number of straight events. If $X \geq X_0$, a steady state is set to true, where $X_0$ is a predefined value, e.g., $X_0$=2.

In one embodiment of case 2 for consecutive L event or M events (There could be some N events among L or M events), different from Case 1, N events are allowed to happen among L or M events. For example, the event sequence: L, N, N, L, N, and L, fall into this case. X is provided to denote number of consecutive L or M events, and Y to denote number of N events, starting from the first L or M event. For example, in event sequence N, L, N, N, L, N, it is defined that X=2, and Y=3. In such embodiment, if X≥X$_1$ or $$X + \frac{Y}{4} \geq X_2,$$

a steady state is set to true. Here, X$_1$<X$_2$. One embodiment is X≥3 or $$X + \frac{Y}{4} \geq 4.$$

In one embodiment of case 3 for mixed L events and M events, in which L events and M events are mixed together, N events can exist among those L and M events as well. In such embodiment, a buffer is set to store L events and M events. The buffer size is T. X$_L$ is provided to denote the number of L events within the buffer, and X$_M$ to denote the number of M events within the buffer. If $$\frac{\min(X_L, X_M)}{\max(X_L, X_M)} \leq X_3,$$

a steady state is set to true. In one example, T=5, and X$_3$=0.25.

Once one of above cases is met, a steady state remains true until the steady state re-check module (e.g., circuit) turns off Steady State Re-Check.

After reaching a steady state, the steady state re-check module is provided to keep tracking the QAI setting. If the QAI setting is varying too often, the steady state recheck module (e.g., circuit) would turn off steady state, which would restart the steady state checking (SSC).

After each L event or M event, the Q table would be updated. The new QAI value is recorded in a first-in first-out (FIFO) type buffer. The buffer size is N$_q$. Within this buffer, if QAI=I$_Q$ appears between any two QAI=1, it would set steady state as false. Or if between two QAI QAI=1 appears, it would set the steady state as false as well. When steady state is false, either a predefined QAI setting is used or the QAI setting in last true steady state is used.

Modern day smartphones equipped with GPS can accurately predict the location of the device up to 4 meters of accuracy. Despite its great success for applications like navigation, sports tracking and finding the device when it's lost, GPS is unable to provide reliable location information for indoor environments due to signal blockage and the resolution provided by the GPS is quite large for many indoor scenarios.

As Wi-Fi based internet solutions have become immensely popular, Wi-Fi routers or access points (AP) is now omnipresent at homes, apartments and public areas. The received signal strength indication (RSSI) from these APs is directly proportional to distance and can be used as a metric to measure the location of the device from the router. Getting more RSSI values from other routers, it can be found that a relative location of the device which is defined by a set of the AP Basic Service Set Identifier (BSSID) and the RSSI value from that AP.

In the present disclosure, the location is used to find zones of poor connection with respect to a connected AP (CAP) of the smartphone This poor link location is used as a context to benefit the Intelligent Wi-Fi connection (IWC), but this can be used for other applications as well. The locations are unknown and the unsupervised learning is used to discover the locations using the BSSID and RSSI of the other APs (OAP) surrounding the CAP.

Figure 11:
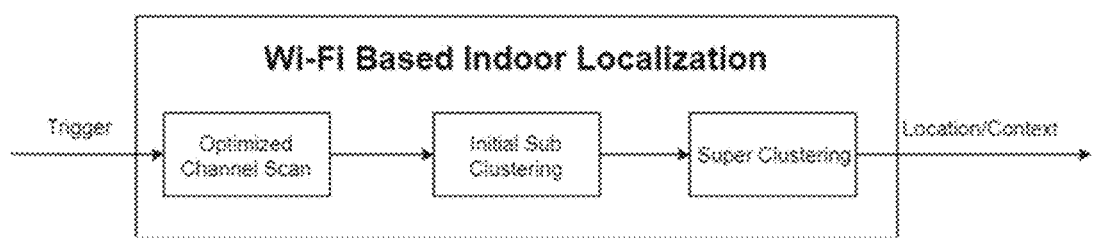
FIG. 11 illustrates an example algorithm flow according to embodiments of the present disclosure.

FIG. 11 illustrates an example algorithm flow 1100 according to embodiments of the present disclosure. The embodiment of the algorithm flow 1100 illustrated in FIG. 11 is for illustration only. FIG. 11 does not limit the scope of the present disclosure to any particular implementation.

The presented disclosure comprises three key modules (e.g., circuit) as shown in FIG. 11. For example: optimized Channel Scan (OCS); initial sub clustering; and super clustering.

Optimized Channel Scan.

The clustering of the locations is done based on the RSSI value of OAPs with reference to the device. These devices are discovered by performing a Wi-Fi scan to discover the surrounding OAPs and their BSSIDs and RSSIs. This scan usually takes a long time as it needs to scan across all channels and frequent active scanning is also taxing on the battery. Apart from this, not all the channels are populated with OAPs, which means that recurrently scanning these empty channels can be a waste of valuable computation time. To overcome these shortcomings of a regular channel scan, an optimized channel scan (OCS) has been presented here. The flow of OCS has been presented in FIG. 12.

Figure 12:
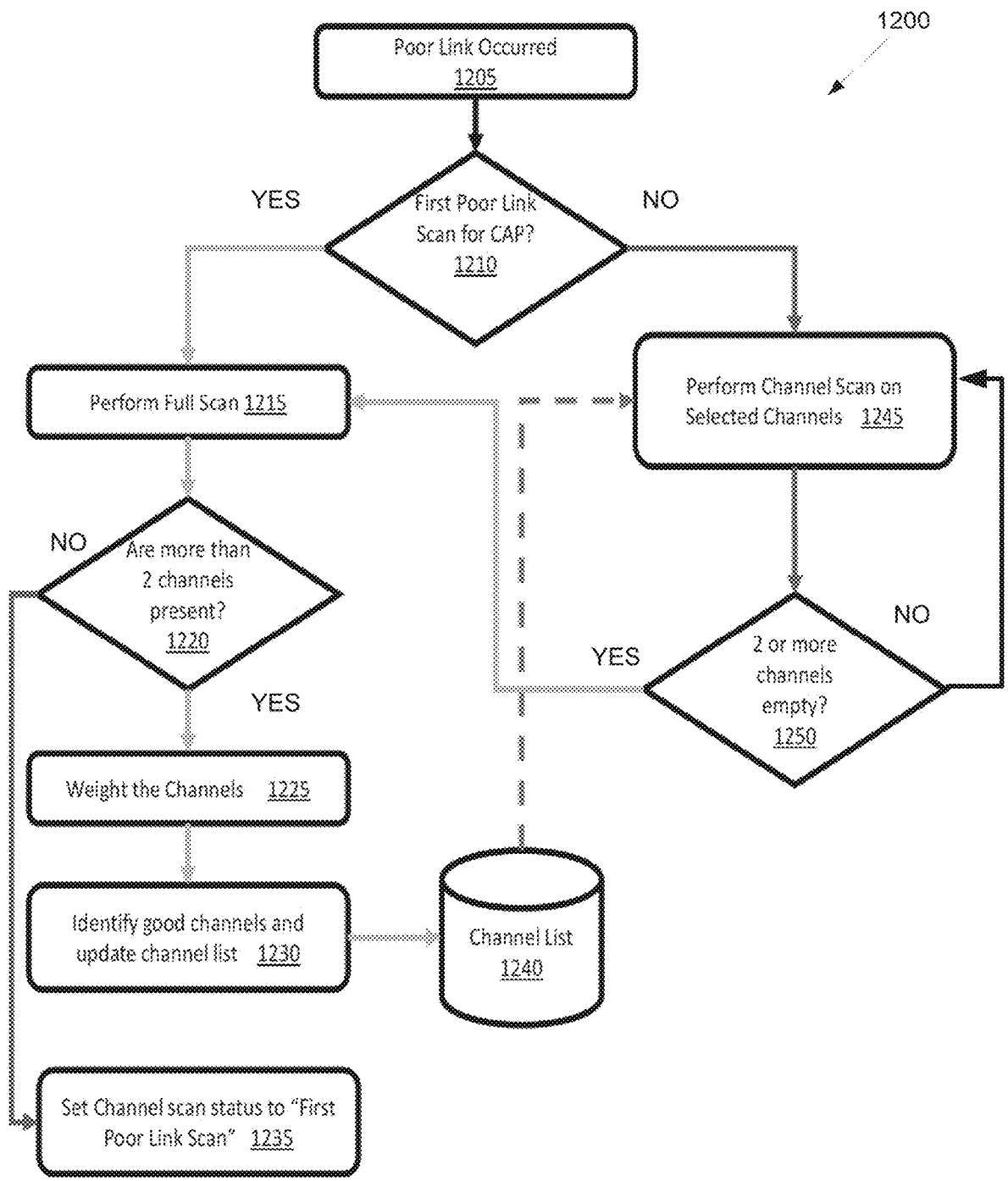
FIG. 12 illustrates a flow chart of an optimized channel scan flow according to embodiments of the present disclosure.

FIG. 12 illustrates a flow chart of an optimized channel scan flow 1200 according to embodiments of the present disclosure. The embodiment of the optimized channel scan flow 1200 illustrated in FIG. 12 is for illustration only. FIG. 12 does not limit the scope of the present disclosure to any particular implementation.

As illustrated in FIG. 12, the optimized channel scan flow 1200 in step 1205 determines a poor link occurred. In step 1210, the optimized channel scan flow 1200 determines whether a first poor link is scanned for CAP. In step 1210, if the first poor link is scanned in step 1210, the optimized channel scan flow 1200 performs a full scan in step 1215. In step 1220, the optimized channel scan flow 1200 determines whether more than 2 channels are present. If more than two channels are present in step 1220, the optimized channel scan flow 1200 weights the channel in step 1225. In step 1230 the optimized channel scan flow 1200 identifies good channels and updates the channel list. In step 1220, more than 2 channel are nor present, the optimized channel scan flow 1200 sets the channel scan status to "first poor link scan" in step 1235. In step 1210, the first poor link is not scanned for CAP, the optimized channel scan flow 1200 performs the channel scan on selected channels in step 1245. In step 1250, the optimized channel scan flow 1200 determines two or more channel are empty. If two or more channels are empty in step 1250, the optimized channel scan flow 1200 performs the full scan in step 1215. If two or more channel are not empty in step 1250, the optimized channel scan flow 1200 performs channel scan on the selected channels in step 1245.

An OCS is initiated based on a trigger provided by a smartphone module (e.g., circuit). In the present disclosure, the trigger is provided by the WiFi link information, which evaluates if the WiFi connection is good or poor. The WiFi link information incorporates the CAPs BSSID, RSSI, a number of bad transmitted packets, a number of beacon loss, and a number of re-transmissions but can be extended to contain other information as well. Based on a combination of the WiFi link information, a poor WiFi link trigger may be created. It is worth mentioning that the present disclosure can be triggered by other modules as well to create a relative location map based on the application of interest.

Once triggered, the OCS checks if a channel list has been created. A channel list is just a collection of the channel numbers that have been identified as the best channels by OCS. Each CAP that the smartphone connects to has a channel list associated with each CAP. When the smartphone connects to the CAP for the first time, the channel list is empty and initialized. A full scan may be performed on all the available channels (as the number of Wi-Fi channels accessible vary globally). Once all the channels have been scanned, the optimum channels may be identified based on the following 2 criteria: the channel may provide a suitable number of OAPs to justify the time required to scan; and the average RSSI value of the channel may also be high to ensure that the OAPs appear consistently in the region the channel was evaluated in.

For these, a weight metric is created where both criteria are normalized and summed with equal weights attached to both metrics. The channels that provide the higher weights may be chosen for the channel scan. The equations to calculate the weights are provided as follows:

$$W_{OAP,c} = \frac{N_{OAP,c}}{N_{OAP,total}} \text{ and } W_{RSSI,c} = \frac{\text{abs}(RSSI_{min}) + \mu_{RSSI,c}}{\text{abs}(RSSI_{min})}$$

where $N_{OAP,c}$ is the number of OAPs in channel c, $N_{OAP,total}$ is the total number of OAPs in all channels and $W_{OAP,c}$ is the weight associated with the number of OAPs.

In the second equation $\mu_{RSSI,c}$ is the average RSSI of all the OAPs in channel c, $RSSI_{min}$ is a pseudo minimum value used to normalize the RSSI value (which is inherently a negative value, between 0 and 1, and $W_{RSSI,c}$ is the RSSI based weight of the channel. The weight metric used to evaluate the channels is a sum of the above two weights. The reason behind choosing a pseudo minimum RSSI value lies in the fact that RSSI values have no definite minimum value but the device can only measure up till a finite minimum RSSI value. A value can be used to normalize the weights between 0 and 1.

Based on the weights calculated above, the channels are sorted in descending order and the top 5 channels are selected for the channel list. Next time when the trigger occurs, only the identified channels may be scanned.

As the OAPs migrate to different channels over time, if the number of empty channels scanned using the channel list is greater than 1, the channel list is calculated again using the above mentioned steps. The data collected from the OCS consists of a set of OAP BSSIDS and respective RSSI values.

Initial Sub Clustering.

The zones surrounding the CAP are discovered using unsupervised learning. Unsupervised learning is used here as OAP distribution varies across environments e.g. single family home, apartments, office etc. The aim of the unsupervised learning is to discover zones around the CAP and update the zones if previously unknown zones are encountered.

In the present disclosure, affinity propagation is provided to cluster the zones around the CAP. To implement an on-the-fly clustering algorithm, that is capable of updating the zones as new ones are encountered, streaming affinity propagation (StrAP) is used as it can handle streaming data and update or create new zones based on unseen data.

As the dataset of OCS consists of unbalanced sets of BSSID and RSSI, similarity instead of traditional distance metrics is used to relate the closeness between two data points.

In one embodiment, the similarity metrics used may be cosine similarity, In such embodiment, the RSSI of each OAP is normalized using the formula:

$$RSSI_+ = \frac{(RSSI + \text{abs}(RSSI_{min}))^e}{\text{abs}(RSSI_{min})^e}$$

where, $RSSI_+$ is the normalized positive value of the RSSI recorded per OAP and $RSSI_{min}$ is an empirically chosen minimum value to normalize the data between 0 to 1. After $RSSI_+$ has been calculated, the cosine similarity is calculated between the two data points.

As the sets may be mismatched due to absence of OAPs, the union of the two data points is found and replace the missing $RSSI_+$ with 0. The cosine similarity between the datapoints is then calculated as given by:

$$S_{cos}(i, j) = \frac{RSSI_{OAP,i+} \cdot RSSI_{OAP,j+}}{\|RSSI_{OAP,i+}\| \|RSSI_{OAP,j+}\|}$$

where $S_{cos}(i,j)$ is the cosine similarity between datapoint i and j, $RSSI_{OAP,i+}$ are the normalized RSSI values for data point i and $RSSI_{OAP,j+}$ are the normalized RSSI values for datapoint j.

In one embodiment, the similarity metrics used may be proximity threshold similarity (PTS). In such embodiment, a hard threshold is used to find how many OAPs lie inside a boundary threshold for two data points. To calculate the similarity, first the intersection set of the common OAPs, $BSSID_{inter}$, is calculated as given by $BSSID_{inter} = BSSID_i \cap BSSID_j$ where $BSSID_i$ is the set of all BSSIDs for datapoint i and $BSSID_j$ is the set of all the BSSIDs for data point j.

From the intersection set, it may be checked that if the OAPs lie close to each other within a certain threshold using the following formula as given by $S_{PT}(i,j) = \Sigma_{n \in BSSID_{inter}} f(\Delta - |RSSI_i(n) - RSSI_j(n)|)$, $$f(x) = \begin{cases} 1 & x \geq 0 \\ 0 & x < 0 \end{cases}$$

where $\Delta$ is a user defined threshold, $RSSI_i$ and $RSSI_j$ are RSSI of datapoint i and j respectively.

The similarity metrics indicated above are used to cluster the data points into different zones based on their closeness to each other. To cluster the data, the affinity propagation (APr) algorithm may be used for the initial clustering and streaming affinity propagation (SAPr) to do the incremental clustering as new data keeps coming in. The clustering algorithms create reference location identifiers using exemplars, which are reference points similar to the data points collected during Wi-Fi scans. The same similarity functions mentioned are used to identify future data points by evaluating their similarity with respect to the exemplars and then allocating the data point to the cluster with the most similar exemplar.

The exemplars can be created in two ways. In one embodiment of conventional way (according to APr algorithm), the APr algorithm identifies one of the existing data points as the exemplar. That data point then represents all the surrounding data points subject to similarity, thus creating a cluster.

In one embodiment of collective average (e.g., full BSSID representation), all the BSSIDs is collected and averaged their RSSI based on how many times the BSSIDs occurred in the cluster. This helps to represent the cluster with all the BSSIDs in the data points and can also remove the negative of outliers that may be prevalent if one data point is used as a representative.

Super Clustering.

In the previous section, the unsupervised clustering creates clusters quite rapidly and independent small zones may get created which in a way are similar to one of the existing zones. To overcome this hurdle, a super clustering technique is provided, which compares the average similarities between the clusters and groups them together subject to an empirical threshold. In the super clustering, the average similarity is compared between the clusters and then group the clusters constrained to an empirical threshold.

The cluster similarity is calculated based on the formula given by $$M_{pq} = \frac{1}{N_{Cp} \times N_{Cq}} \sum_{i \in Cp, j \in Cq} S(i, j)$$

where $M_{pq}$ is the inter cluster similarity, $N_{cp}$ is the number of data points in Cluster p and S(i,j) is the similarity between data point i from Cp cluster and j from cluster Cq. The similarity used here is the similarity on which the initial sub clustering was done i.e. cosine or PTS.

The super cluster can be created based on observing the inter cluster similarity $M_{pq}$ and within cluster similarity $M_{pp}$. The following two techniques may be used to create the super clusters. In one embodiment, clustering the sub clusters on inter and within cluster similarity using APr algorithm to create super clusters may be created. In one embodiment, clustering an empirical threshold between inter and within cluster similarity. If the different between the two clusters falls under the threshold, two clusters are clubbed to create super clusters.

For recall, whenever the poor link trigger is generated, the sub-cluster gets generated based on the output of the OCS and the super cluster which encompasses the sub-cluster generated is the final context output of the WiFi based indoor localization module.

Support for mobile users within an 802.11-based network infrastructure necessitates efficient techniques for seamless handoff/roaming/switch between APs/LTE, as the user moves from one area to the next. The handoff/roaming/switch algorithm in the current generation of 802.11 networks are primarily reactive in nature, because the 802.11 networks wait until the link quality degrades substantially to trigger a handoff.

Moreover, it takes around 4~12 seconds for a device to switch/handoff from one AP to another AP. Most of the time may be spent on the detection, i.e., detecting when to disconnect from the current AP, scanning, i.e., searching which AP to connect to, and communication reset-up, i.e., setup the application layer communication. In the present disclosure, a WiFi roaming, a WiFi switching, and a WiFi handoff are interchangeable each other. A typical WiFi roaming procedure is illustrated in FIG. 13.

Figure 13:
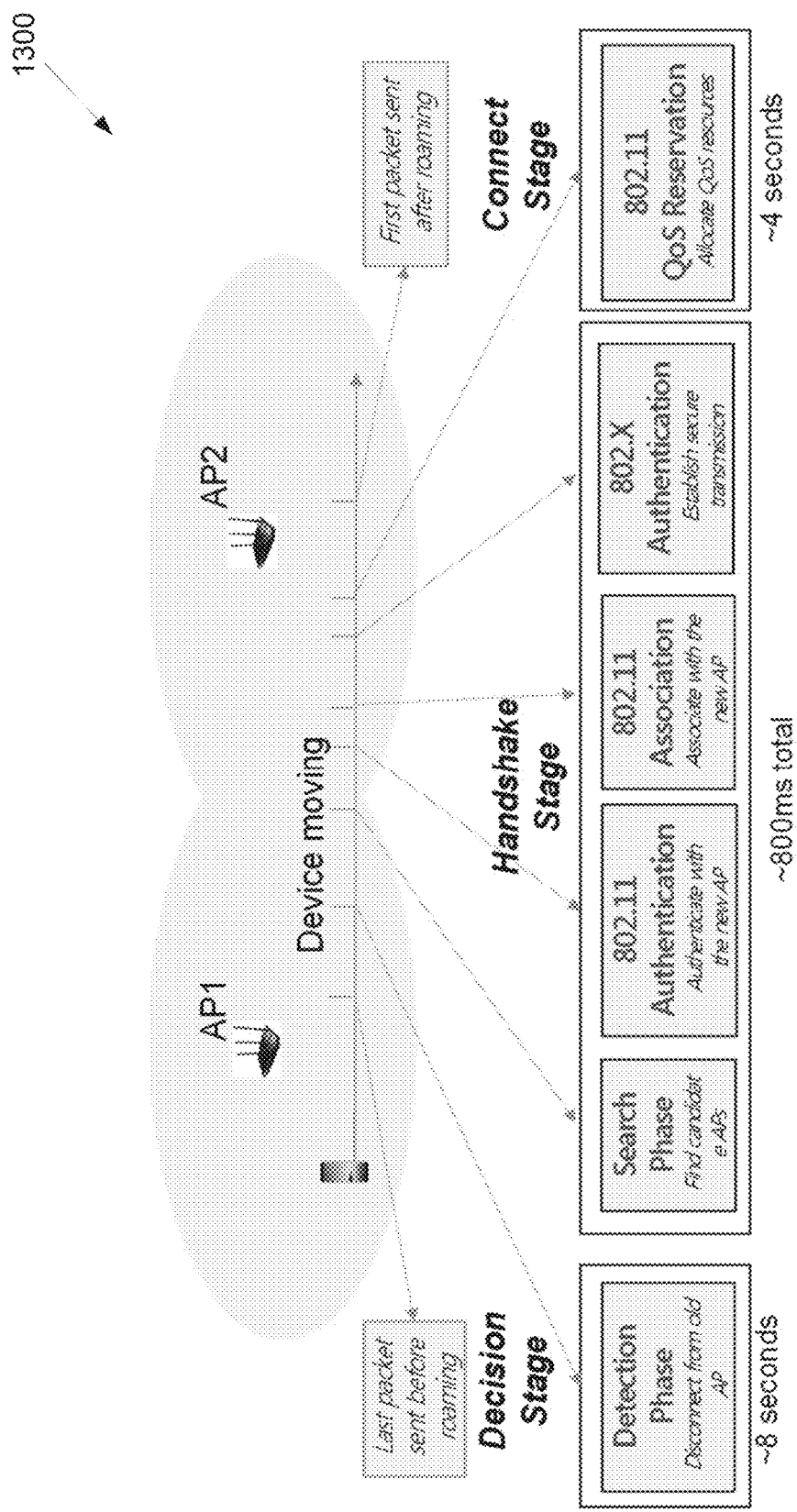
FIG. 13 illustrates an example WiFi roaming procedure according to embodiments of the present disclosure.

FIG. 13 illustrates an example WiFi roaming procedure 1300 according to embodiments of the present disclosure. The embodiment of the WiFi roaming procedure 1300 illustrated in FIG. 13 is for illustration only. FIG. 13 does not limit the scope of the present disclosure to any particular implementation.

The first stage is the decision stage: the device need to decide when to trigger the roaming process and decide when to disconnect from the current AP. When the user moves at the coverage boundary of the CAP, both the throughput and the RSSI may drop. User under this circumstance may experience bad quality of serve. If the device continue to move far away from the CAP and no roaming is taken, then the device may lose the beacon and totally loses the connection. If the device selects to switch to another AP or to disconnect AP (disconnection from AP may lead to connection to cellular data link) after totally loses the beacon, it might be too late and the user may experience a long time wait before the new connection is setup.

The second stage is the handshake stage. After user trigger the switch decision, it may do the authentication, association and authentication again to setup a safe communication tunnel. The last stage is the connect stage where the new AP may setup the communication link for the device.

Figure 14:
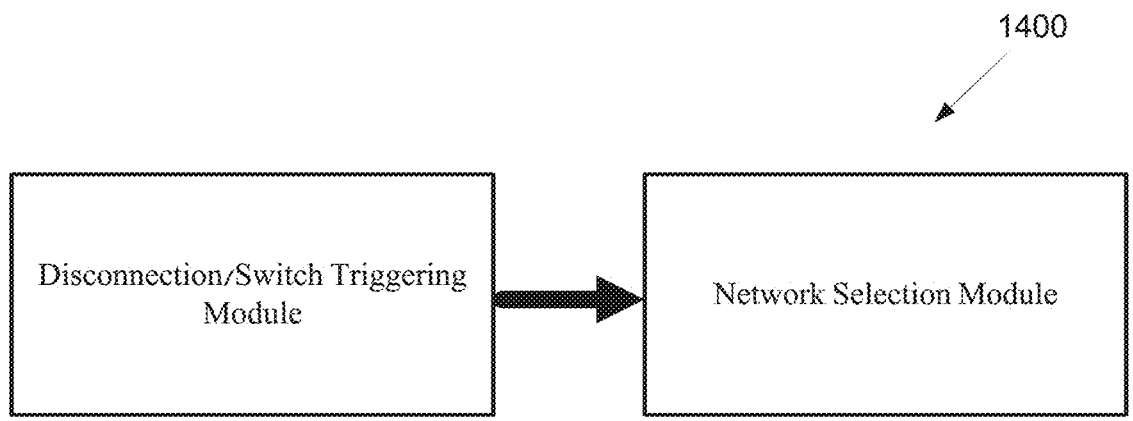
FIG. 14 illustrates an example roaming decision procedure according to embodiments of the present disclosure.

FIG. 14 illustrates an example roaming decision procedure 1400 according to embodiments of the present disclosure. The embodiment of the roaming decision procedure 1400 illustrated in FIG. 14 is for illustration only. FIG. 14 does not limit the scope of the present disclosure to any particular implementation.

As shown in FIG. 14, WiFi roaming decision making includes two procedures. First, it needs to find a good disconnection or switch point (triggering). And then network selection module (e.g., circuit) decides where to switch to (For switching to cellular data, it is disconnection from Wi-Fi). The present disclosure is focusing on finding the good disconnection/switching point to improve the roaming performance.

For the second module (e.g., circuit), it may be assumed that there is some existing module (e.g., circuit) would take care of this. The main idea of the present disclosure is to use machine learning (reinforcement learning algorithm) to learn the preference for a specific user and AP so that after training the device could automatically disconnect the AP or kick off a switching at the right point for the user. A PoC demo is built to show that using our developed algorithm, the switching delay can be dramatically reduced.

The current algorithm takes four main parameters related to switching into account: AP BSSID, LQCM, RSSI, and user application. Based on different UE application, the user may have different disconnection/switching delay requirement. For example, when the user is watching online video or playing online game, he/she might have strict switching delay requirement. On the other hand, if the user is downloading some file or the user is not interacting with the cellphone, then the user can tolerant the switching delay. This is the motivation why a UE application is considered as one of the learning parameter. A user application can be either best effort application or foreground application.

In the following, a user application is referred as be mode.

The main idea of the algorithm is to track the disconnecting/switching history and learn from the recorded data. Traditionally, the switching is based on some fixed threshold, which might not be able to capture the user-specific preference and dynamic WiFi environment. On the contrast, in our designed algorithm, the switching threshold is specific to user application, connected AP, expected achievable throughput and received signal strength.

Framework.

Figure 15:
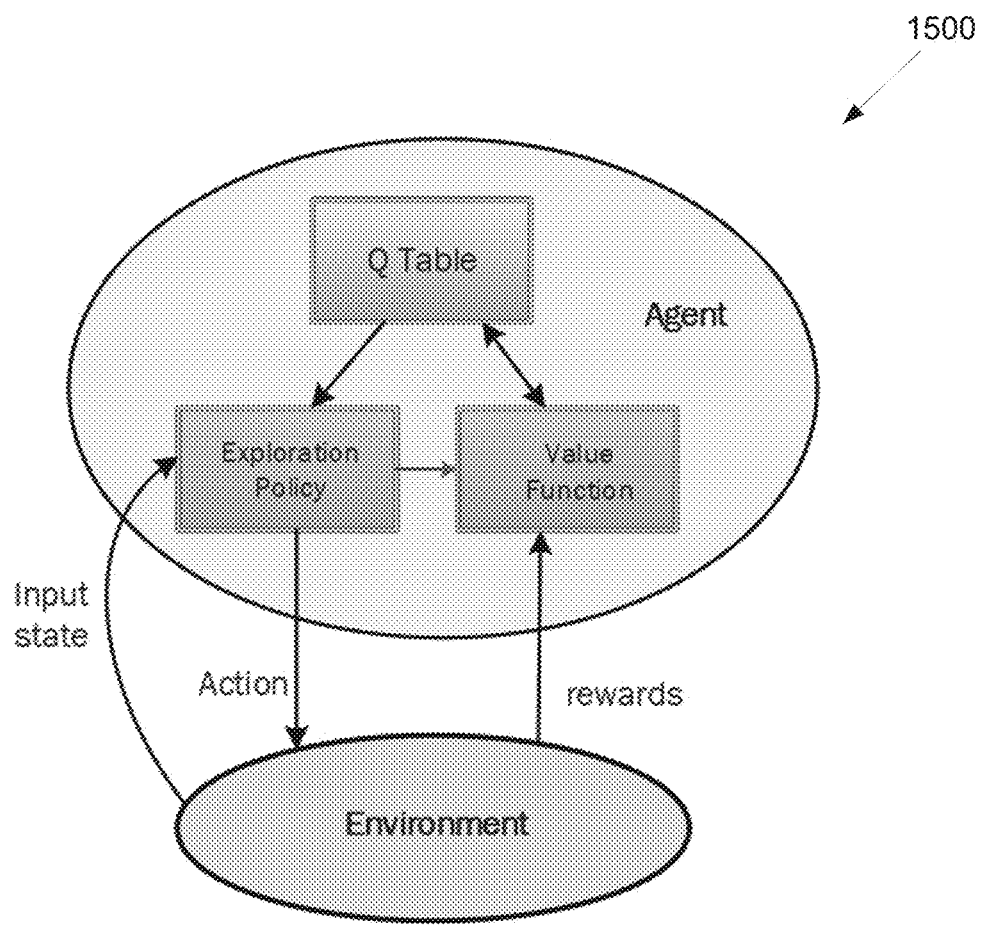
FIG. 15 illustrates an example system design according to embodiments of the present disclosure.

FIG. 15 illustrates an example system design 1500 according to embodiments of the present disclosure. The embodiment of the system design 1500 illustrated in FIG. 15 is for illustration only. FIG. 15 does not limit the scope of the present disclosure to any particular implementation.

In one embodiment, a scheme is provided to find the proper disconnection/switching time. The overall system diagram is shown as FIG. 15. Here the "agent" refers to our algorithm module, and "environment" refers to anything else.

In an agent, there may be three modules (e.g., circuit): Q table, exploration policy module and value function module. The scheme is to develop several tables (called Q table) to record and learn the user behavior. One example to achieve this target is to build two tables named action table $Q_{cs}$ and no action table $Q_n$ to learn optimal switching parameters from user feedback or history data.

Currently, both action table $Q_{cs}$ and no action table $Q_n$ are four dimensional matrixes. The first dimension, $ID_t$, represents the BSSID of the connected AP(CAP) at time step t; the second dimension, $M_t$, represents the current application, i.e., be Mode; the third dimension, $P_t$, represents the RSSI value; the fourth dimension, $L_t$, represents the LQCM. Therefore, action table value $Q_{cs}$ at time t can be expressed as $Q_{cs}(ID_t, M_t, P_t, L_t)$ and no action table $Q_n$ at time t can be expressed as $Q_{na}(ID_t, M_t, P_t, L_t)$. For each entry, a Q value is used to represent the user preference on whether a disconnection/switch is needed or not.

The exploration policy module (e.g., circuit) is responsible for generating the action according Q table. Every time period to, exploration policy module may read the input states including $ID_t, M_t, P_t, L_t$, and then read the corresponding Q table to decide whether to take action or not. If $Q_{cs}(ID_t, M_t, P_t, L_t) > Q_{na}(ID_t, M_t, P_t, L_t)$, then a disconnection/switch is to be considered.

One option is that a channel scan may be triggered after detecting this condition, and then based on the channel scan result, the decision of switch can be made. The other option is that the STA directly disconnect from currant AP and then based on an additional connection module to decide what is the next. If the Q value in no action table is larger, ideally the algorithm may not take any action.

However, in order to further explore during the training section, an exploration threshold $TQ_e$ is provided. If $Q_{na}(ID_t, M_t, P_t, L_t) > Q_{cs}(ID_t, M_t, P_t, L_t) > Q_{na}(ID_t, M_t, P_t, L_t) - TQ_e$, then the algorithm may trigger disconnection/switch randomly with a probability of ε(t), where this probability changes over time. In the Q value of action table is too smaller than the no action table, which means the current device connects to a quite good AP, then the algorithm may stay at the current state and no action may be taken. ε(t) represents the exploration and exploitation trade-off in reinforcement learning.

At the beginning of the training, the algorithm is used to explore. In this case, a high ε value is set. However, as the algorithm converges, the exploration probability is gradually reduced until a minimum threshold so that the algorithm could stay at the best action. Furthermore, in order to reduce the back-and-forth time, i.e., a cooling down timer is introduced so that after a switch the algorithm may not conduct another switch during the cooling down time.

Value function module is to update the value of Q table with the rewards from environment and the action decision from exploration policy module. It is triggered by the events or the decision from exploration policy module. To update the action Q table, it bases on the rewards from environment. The update follows as given by equation (6):

$$Q_{cs}(ID_t, M_t, P_t, L_t) = \alpha Q_{cs}(ID_t, M_t, P_t, L_t) + \beta R_t \qquad (6)$$

In equation (6), where α and β are fixed constant, and $R_t$ is the reward value, which depends on the reward event. Rewards events include two types of events: one type indicates that user wants to disconnect/switch at this state, such as: user manually disconnects or switches; user turns off WiFi; and user accept the proposal from our algorithm (assuming there is a pop-up).

Those events lead to positive reward to corresponding entry in $Q_{cs}$. The other type indicates that user wants to keep the current Wi-Fi connection, such as: user dismisses the proposal from our algorithm (assuming there is a pop-up); and our algorithm decides to disconnect/switch, and users connect back to the original AP within time Ts.

These events lead to negative reward to corresponding entry in $Q_{cs}$. To update the no action table $Q_{na}$, the exploration policy module output is used. If there is no action at state ($ID_t, M_t, P_t, L_t$), the corresponding entry is updated as given by equation (7):

$$Q_{na}(ID_t, M_t, P_t, L_t) = \qquad (7)$$
$$\begin{cases} Q_{na}(ID_t, M_t, P_t, L_t) + 1, & Q_{na}(ID_t, M_t, P_t, L_t) < K \\ Q_{na}(ID_t, M_t, P_t, L_t), & Q_{na}(ID_t, M_t, P_t, L_t) \geq K \end{cases}$$

where K is a pre-defined constant.

In yet for another example, other operational parameters, for example, throughput, and/or number of beacon loss, and/or number of NAK received, and/or BLER, and/or MCS values etc., could be added as additional states in the tables or replace any of the above four parameters.

In yet another scheme of this embodiment, finding the best switching time is to predict the future WiFi link performance. If the future link performance is below a predefined threshold, then a switch may be triggered in advance. One example of this scheme is to use machine learning, for example, LSTM or a neural network to predict the RSSI of the CAP, if the future RSSI is going to be less than a threshold, then a switch may be triggered.

In yet another example, this scheme is used to predict the LQCM and/or throughput, and/or number of beacon loss, and/or number of NAK received, and/or BLER, and/or MCS values etc., using recurrent neural network.

Compare this predicted future rewards, T seconds later, with a predefined threshold. If the future performance is good, then no WiFi switching, otherwise, the algorithm may trigger the switching.

Design for Pop-Up.

Another embodiment of the present disclosure is about the design of pop-up. In order to capture the user preference, two ways are utilized. One is user nature action, such as user manually disconnection or reconnection. The other is interactive mechanism, such as the algorithm generating a pop-up when the interactive mechanism has the intent to take action. An example of the pop-up is illustrated in FIG. 16.

Figure 16:
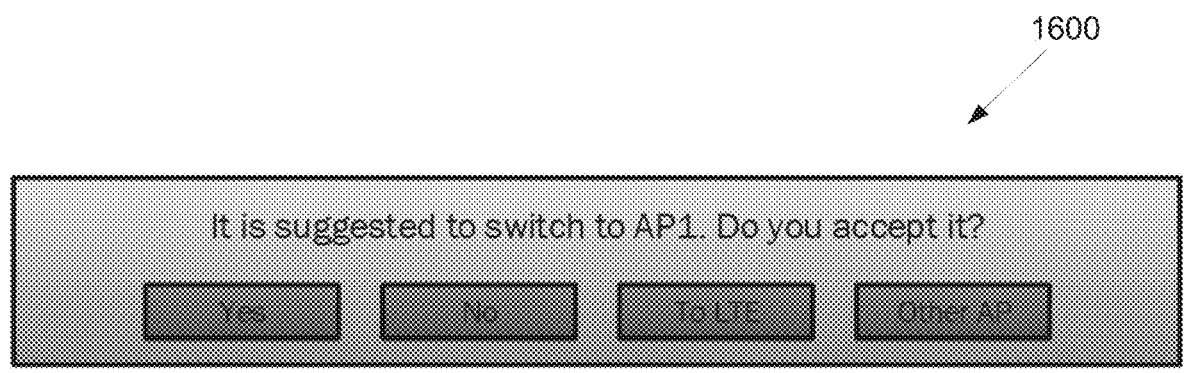
FIG. 16 illustrates an example pop-up according to embodiments of the present disclosure.

FIG. 16 illustrates an example pop-up 1600 according to embodiments of the present disclosure. The embodiment of the pop-up 1600 illustrated in FIG. 16 is for illustration only. FIG. 16 does not limit the scope of the present disclosure to any particular implementation.

This user pop-up including a suggestion context and four option buttons. These four buttons allow user to provide following input to the system. In one example of "Yes" button, accept the proposal from algorithm. In another example of "No" button, dismiss the proposal from the algorithm and keep the current WiFi connection. In yet another example of "To LTE" button, choose to switch to LTE instead of the algorithm proposed AP; and In yet another example of "Other AP", choose to switch to other AP which is not suggested by the algorithm.

User can select to disable this pop-up mechanism and let the algorithm track user behavior only by the user nature actions.

Accelerating the Convergence Time.

Another embodiment of the present disclosure is about a scheme to accelerate the convergence time of the learning algorithm. As an algorithm may be deployed in the real product, the convergence time may affect the user experience. Reducing the convergence item is an important feature of the present disclosure. Convergence time is one of the main performance metric which affect the App design. To accelerate the convergence of the algorithm, a fast convergence technique is developed in the algorithm in the present disclosure. This technique is to explore the main idea that if in the current state, the user desires to disconnect/switch, then in other states with worse connection conditions the user may prefer to switch as well.

To be specific, if it finds that at state $(ID_{t0}, M_{t0}, P_{t0}, L_{t0})$ a manually disconnection/switch happens, then it may reward $Q_{cs}(ID_{t0}, M_{t0}, P_t<P_{t0}, L_t \leq L_{t0})$ with positive reward. On the contrary, if user dismiss a switch at $(ID_{t0}, M_{t0}, P_{t0}, L_{t0})$, then it may reward $Q_{cs}(ID_{t0}, M_{t0}, P_t \geq P_{t0}, L_t \geq L_{t0})$ with negative rewards. The same idea is applied in updating the no action table $Q_{na}$. TABLE 1 shows details of the algorithm.

TABLE 1

Algorithm table.
Algorithm:

- STEP1: INITIALIZATION. DENOTE THE SIZE OF RSSI RANGE OF INTEREST AS |P|, DENOTE BEMODE AS $M_t$, USERRSSI MEASUREMENT AS $P_t$, EQUIVALENT THROUGHPUT AS $L_t$. AFTER STA CONNECTING TOA NEW AP ON CHANNEL CH, NO ACTION Q TABLE $Q_{na}(j, M_t, P_t, L_t)$, ACTION QTABLE $Q_{cs}(j, M_t, P_t, L_t)$.
- STEP2: FOR EVERY TIME STEP $t_0$:
    - STEP 2.1 FETCH THE LINK PARAMETERS $(ID_{t0}, M_{t0}, P_{t0}, L_{t0})$, COMPARE $Q_{na}(\bullet)$ AND $Q_{cs}(\bullet)$:
        - STEP 2.1.1 IF $Q_{cs}(\bullet) > Q_{na}(\bullet)$, TRIGGER ACTION,
        - STEP 2.1.2 IF $Q_{na}(\bullet) - TQ_E < Q_{cs}(\bullet)$
            - EXPLORE THE ACTION
                - IF NO EXPLORATION, GO TO STEP 2.1.3.1 ,ELSE TRIGGER ACTION
        - STEP 2.1.3 ELSE IF $Q_{na}(\bullet) - TQ_E > Q_{cs}(\bullet)$
            - STEP 2.1.3.1 AT THIS STATE UPDATE $Q_{na}(j, M_t, P_t \geq P_{t0}, L_t > L_{t0})$ WITH (EQ2)
EVENT1: [POP UP EXIST] IF USER ACCEPTS THE PROPOSAL
AND
EVENT2: [POP UP NOT EXIST] ALGORITHM SWITCH AND STAY THERE FOR TIME T
    - UPDATE THE ACTION TABLE $Q_{cs,t+1}(j, M_t, P_t \leq P_{t0}, L_t \leq L_{t0}) = \alpha Q_{cs,t}(j, M_t, P_t \leq P_{t0}, L_t \leq L_{t0}) + \beta R_{t+1} (R_{t+1} > 0)$,
EVENT3: [POP UP EXIST] IF USER DECLINES THE PROPOSAL
AND
EVENT4: [POP UP NOT EXIST] ALGORITHM SWITCH AND SWITCH BACK WITHIN TIME TS
    - UPDATE THE ACTION TABLE $Q_{cs,t+1}(j, M_t, P_t \geq P_{t0}, L_t \geq L_{t0}) = \alpha Q_{cs,t}(j, M_t, P_t \geq P_{t0}, L_t \geq L_{t0}) + \beta R_{t+1} (R_{t+1} < 0)$
EVENT5: IF UE MANUALLY SWITCHES TO AAP/LTE K':
    - UPDATE ACTION TABLE $Q_{cs,t+1}(j, M_t, P_t \leq P_{t0}, L_t \leq L_{t0}) = \alpha Q_{cs,t}(j, M_t, P_t \leq P_{t0}, L_t \leq L_{t0}) + \beta R_{t+1} (R_{t+1} > 0)$,
EVENT6: IF AUTOMATICALLY DISASSOCIATE TO THE CURRENT AP
    - UPDATE NO ACTION TABLE $Q_{na}(j, M_{t0}, P_{t0} < P_{t0} + 1, L_t < L_{t0}) = -2$,
    - UPDATE ACTON TABLE $Q_{cs,t+1}(j, M_t, P_t \leq P_{t0}, L_t \leq L_{t0}) = \alpha Q_{cs,t}(j, M_t, P_t \leq P_{t0}, L_t \leq L_{t0}) + \beta R_{t+1} (R_{t+1} > 0)$,
END The algorithm as shown in TABLE 1 can be also divided into the following processes: an algorithm decision process, a user decision process, a user manually switch process, and a device automatically disconnected process.

Operational Process.

In one embodiment of the operational process, the algorithm makes the decisions of taking action (triggering disconnection/switch) based on the Q table. If the algorithm finds that based on the current measurement, i.e., state $(ID_{t0}, M_{t0}, P_{t0}, L_{t0})$, the value of action table is larger than the value of no action table, then an action triggering may be generated. If the Q value belongs to the exploration range, i.e., an action table value is smaller than the no action table value but larger than the no action value minus a threshold, then an exploration process may be triggered. This exploration stage is trying to explore a better option to further reduce the ambiguity. If the channel scan action value is too smaller, then the no-action table may be rewarded. Details of the process can be found in FIG. 17.

Figure 17:
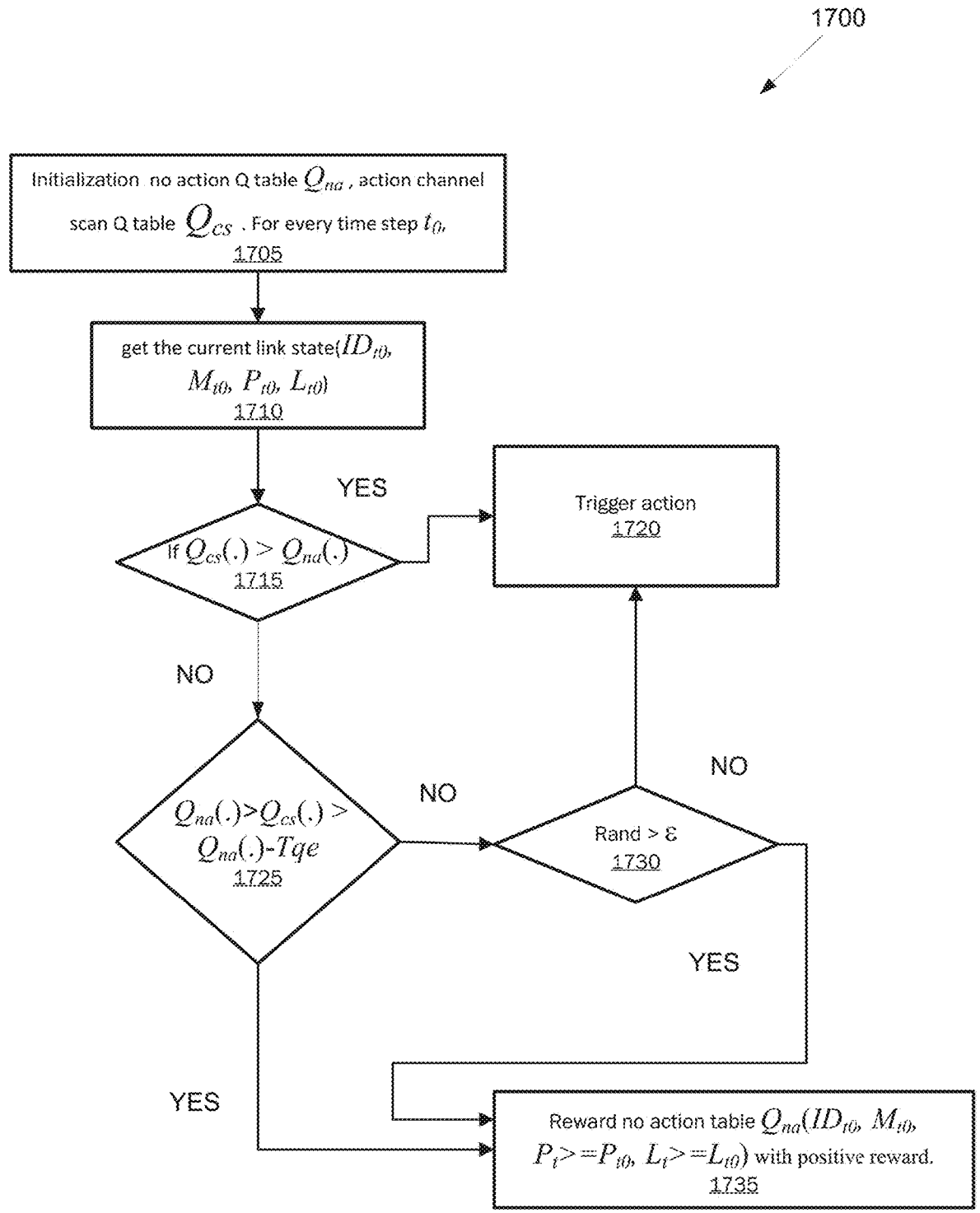
FIG. 17 illustrates a flow chart of a method for an algorithm decision according to embodiments of the present disclosure.

FIG. 17 illustrates a flow chart of a method 1700 for an algorithm decision according to embodiments of the present disclosure. The embodiment of the method 1700 illustrated in FIG. 17 is for illustration only. FIG. 17 does not limit the scope of the present disclosure to any particular implementation.

As illustrated in FIG. 17, the method 1700 in step 1705 initialize: no action Q table $Q_{na}$, action channel scan Q table $Q_{cs}$, for every time step $t_0$. In step 1710, the method 1700 gets the current link state ($ID_{t0}$, $M_{t0}$, $P_{t0}$, $L_{t0}$). In step 1715, the method 1700 determines if $Q_{cs}(.)>Q_{na}(.)$. In step 1720, the method 1700 triggers action if the condition is met in step 1715. In step 1725, the method 1700 determines if $Q_{na}(.)>Q_{cs}(.)>Q_{na}(.)-Tqe$. In step 1725, the condition is not met, the method 1700 determines Rand>ε 1730. The method 1700 in step 1735 rewards no action table $Q_{na}(ID_{t0}, M_{t0}, P_t>=P_{t0}, L_t>=L_{t0})$ with positive reward. The method 1700 performs step 1735 if the condition is met in step 1725.

User Decision Process.

Figure 18:
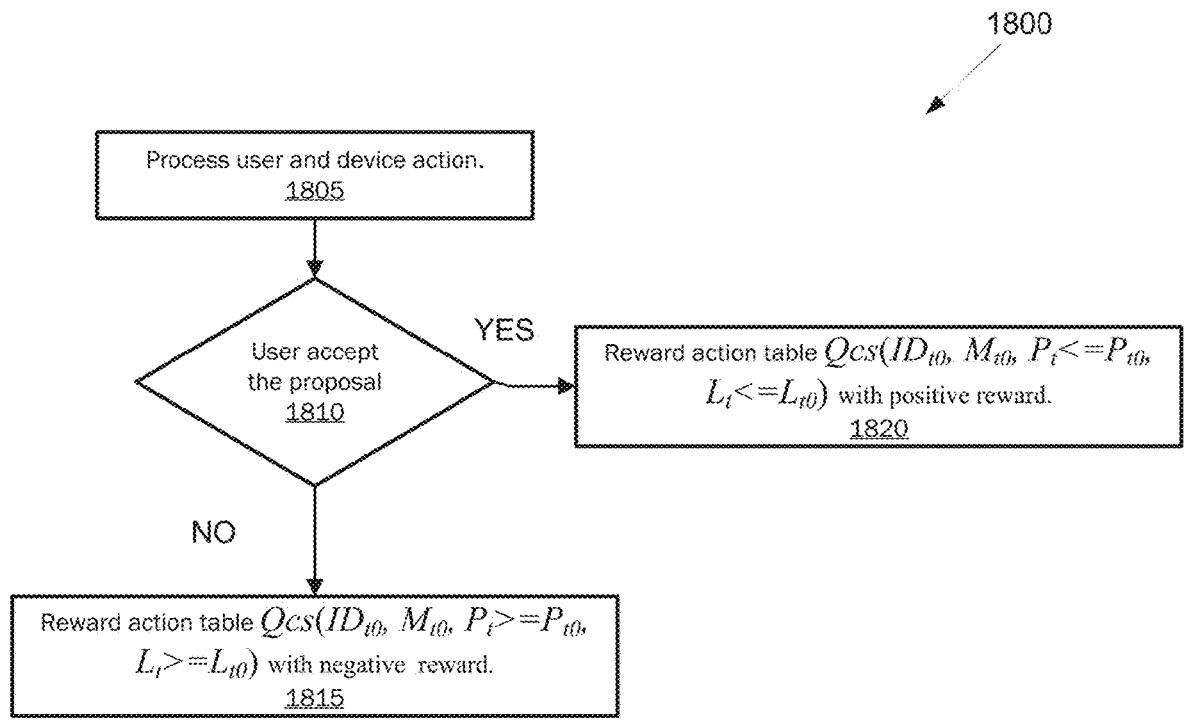
FIG. 18 illustrates a flow chart of a method for a user decision according to embodiments of the present disclosure.

FIG. 18 illustrates a flow chart of a method 1800 for a user decision according to embodiments of the present disclosure. The embodiment of the method 1800 illustrated in FIG. 18 is for illustration only. FIG. 18 does not limit the scope of the present disclosure to any particular implementation.

As illustrated in FIG. 18, the method 1800 in step 1805 processes used and device action. In step 1810, the method 1800 determines a user accepts the proposal. If the user accepts the proposal in step 1810, the method 1800 rewards action table $Qcs(ID_{t0}, M_{t0}, P_t<=P_{t0}, L_t<=L_{t0})$ with positive reward. In step 1810, if the method 1800 determines no user accept the proposal, the method 1800 rewards action table $Qcs(ID_{t0}, M_{t0}, P_t>=P_{t0}, L_t>=L_{t0})$ with negative reward in step 1815.

The next process is the user decision process. This process deals with the user decisions based on the algorithm proposal. After the algorithm provides the candidate AP (by network selection module in FIG. 14) to switch to, a user may accept this recommendation or decline this recommendation according to different user preference. If the user accepts this proposal/recommendation (choose to switch to LTE or other AP is also counted as "accept"), a positive reward may be added to the current action table. Otherwise, a negative reward may be added to the channels scan table and AP selection table.

User Manually Switch Process.

Figure 19:
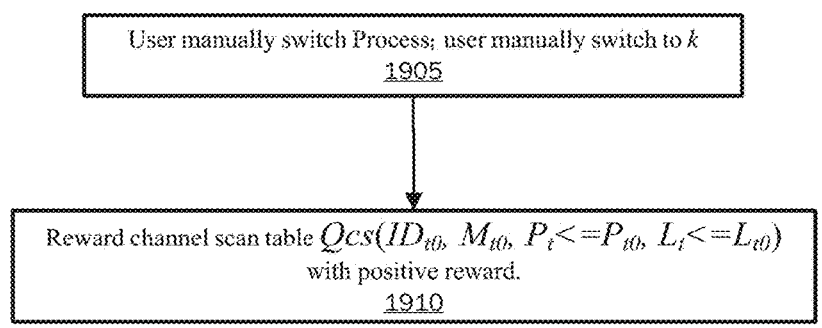
FIG. 19 illustrates a flow chart of a method for a user manual switch according to embodiments of the present disclosure.

FIG. 19 illustrates a flow chart of a method 1900 for a user manual switch according to embodiments of the present disclosure. The embodiment of the method 1900 illustrated in FIG. 19 is for illustration only. FIG. 19 does not limit the scope of the present disclosure to any particular implementation.

As illustrated in FIG. 19, the method 1900 in step 1905 performs that a user manually switches process (e.g., a user manually switch to k). In step 1910, the method 1900 in step 1910 rewards channel scan table $Qcs(ID_{t0}, M_{t0}, P_t<=P_{t0}, L_t<=L_{t0})$ with positive reward.

After the user decision process, the algorithm may go to the user manually switch process. If the user manually switches to an OAP/LTE, then it would reward the action Q table.

Device Automatically Disassociated Process.

Figure 20:
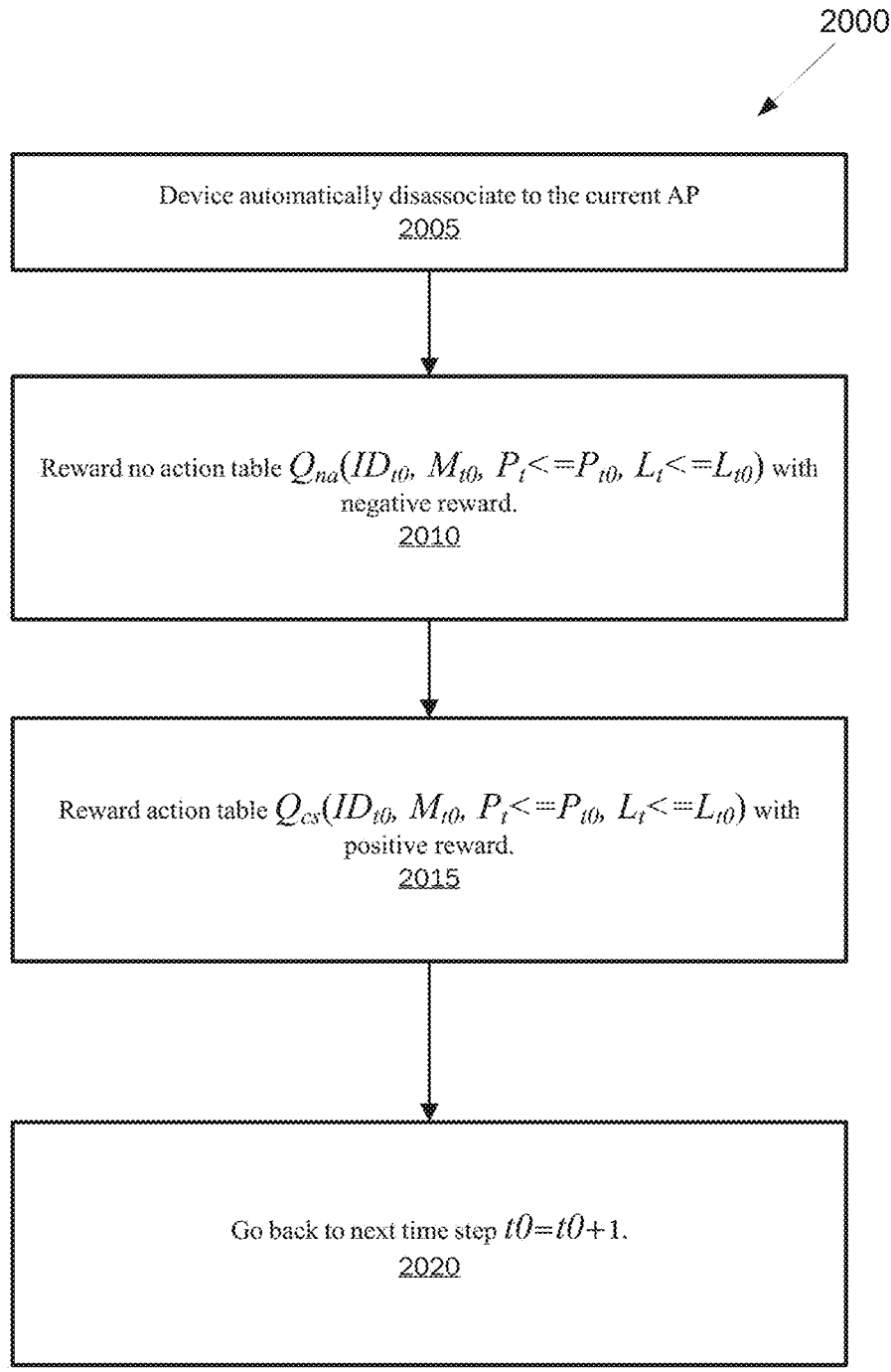
FIG. 20 illustrates a flow chart of a method for an automatic disassociation according to embodiments of the present disclosure.

FIG. 20 illustrates a flow chart of a method 2000 for an automatic disassociation according to embodiments of the present disclosure. The embodiment of the method 2000 illustrated in FIG. 20 is for illustration only. FIG. 20 does not limit the scope of the present disclosure to any particular implementation.

As illustrated in FIG. 20, the method 2000 in step 2005 performs that a device automatically disassociate to the current AP. In step 2010, the method 2000 rewards no action table $Q_{na}(ID_{t0}, M_{t0}, P_t<=P_{t0}, L_t<=L_{t0})$ with negative reward. In step 2015, the method rewards action table $Q_{cs}(ID_{t0}, M_{t0}, P_t<=P_{t0}, L_t<=L_{t0})$ with positive reward. In step 2020, the method 2000 goes back to next time step $t0=t0+1$.

If an automatically disassociation is detected, then it may need to punish the no action Q table and reward the action table, so that the next time an action may be taken in advance to avoid the device disassociation. Therefore, whenever an automatically disassociation is detected, the no action Q table and the action Q table are punished, i.e., negative reward.

Find the Switch Channel (Partial Scan).

In one embodiment, the best channels finding is provided to scan so that the switching time can be reduced. One of the main delay during WiFi roaming is due to the long channel scan time. As indicated in the literature as well as confirmed by our experimental measurement, the channel scan time on each channel is around 40 ms. A full total channel scan which covers all the channel might take 3~4 seconds. Therefore, in order to further reduce the switching delay, a partial channel scan algorithm is needed.

In one embodiment, every time the device makes a switch and the channel of the switched AP may be recorded. For each connected AP (CAP), the algorithm may maintain a partial channel table so that every time when a channel scan is triggered, the algorithm may scan the channel recorded for this CAP. In this case, the channel scan time may be reduced.

In another embodiment, a neural network is provided, for example, CNN or RNN, LSTM to make the decision of the what is the next channel(s) to scan. The neural network is trained online or offline, superwise or unsuperwised. The input to the neural network could be the LQCM and/or throughput, and/or number of beacon loss, and/or number of NAK received, and/or BLER, and/or MCS values etc.

Find the Best AP to Switch to.

In one embodiment, finding the best AP is provided to switch to. One of the important feature of WiFi Roaming is to find the best candidate AP/LTE to switch to after the algorithm triggers the channel scan. The switched AP may have better channel condition, smooth user application experience quality, and better user preference. One of the method of this embodiment is that the algorithm may maintain a Q table of candidate AP/LTE, $Q_{AP}$ for each CAP. One example of this method is that the Q table is a two dimensional matrix where the first dimension represents the RSSI value, $P_t$, and the second dimension represents the AP ID (BSSID). After channels scan, the RSSI value of each AP is used to look for the corresponding Q value. And the AP with the greatest Q value may be selected as the new connected AP. If the selected AP is current CAP, then no switching may happen.

If the user manually switches to an AP $ID_t$ with RSSI $P_t$, then the Q table value of the corresponding item may be increased so that next time, when similar conditions are met, the user may remember this action. However, the learning of the algorithm could not count only on user manually switching behavior. User might get bored by manually switching the APs. To address this issue, the algorithm may show a candidate AP to the user (i.e., a pop-up) when the algorithm detects a better AP.

If user accepts this suggestion, i.e., the user switches to the proposed candidate AP, then the Q table value of the corresponding items may be increased; otherwise, the corresponding items may be decreased. If the provided mechanism is not allowed and algorithm result directly executes, the Q table may be updated as following. After algorithm result executes (switching) for time T, user manually switch the CAP to another AP. In this case the Q value of the user selected AP in original CAP Q table may be rewards. If a user does not take any action (stay with algorithm switching result) for more than time T, then the Q value of the selected AP may be increase. The algorithm gets trained by each switch action during the training stage to learn the user preference and the mobile environment.

In yet another example, a table of LQCM and/or throughput, and/or number of beacon loss, and/or number of NAK received, and/or BLER, and/or MCS values etc., are built. TABLE 2 shows detail algorithm.

TABLE 2

Algorithm table
Algorithm 1: WiFi Roaming Algorithm

- STEP1: INITIALIZATION. DENOTE THE SIZE OF RSSI RANGE OF INTEREST AS |P|, DENOTE BEMODE AS $M_t$, USERRSSI MEASUREMENT AS $P_t$, EQUIVALENT THROUGHPUT AS $L_t$. AFTER STA CONNECTING TOA NEW AP ON CHANNEL CH, THE STA SHOULD INITIALIZE THE CANDIDATE AP SET FOR THE CURRENT AP J AS $A_j = \{j\}$, CANDIDATE CHANNEL SET $C_j = \{ch\}$, A SWITCH Q TABLE $Q_{OAP} = (|P|,1)$.
- STEP2: FOR EVERY TIME STEP $t_0$:
  - STEP 2.1 FETCH THE LINK PARAMETERS $(ID_{t_0}, M_{t_0}, P_{t_0}, L_{t_0})$:
    - STEP 2.1.1 IF USER TRIGGERS CHANNEL SCAN AND ROAMING, SCAN CHANNELS IN $C_j$,
      - STEP 2.1.1.1 STA CONNECTS TO THE BEST AP ACCORDING TO $K = \text{argmax}_{k \in A_j} Q_{OAP}(P_{t_0}(k),k)$ ; [POP UP THE SELECTION OF BOX];
        - IF TWO ITEMS HAVE THE SAME Q VALUE, SELECT THE OAP WITH THE HIGH RSSI
        - IF BOTH LTE AND OAP HAS THE SAME Q VALUE, SELECT OAP INSTEAD OF LTE.
- EVENT 1: [POP UP EXIST] IF USER ACCEPTS THE PROPOSAL
  - UPDATE THE Qs TABLE $Q_s(P > P_{t_0}(K'),K') = \beta Q_{OAP}(P > P_{t_0}(K'),K') + 1$
- EVENT 2: [POP UP NOT EXIST] ALGORITHM SWITCH AND STAY THERE FOR TIME T
  - UPDATE THE Qs TABLE $Q_s(P > P_{t_0}(K'),K') = \beta Q_{OAP}(P > P_{t_0}(K'),K') + 1$
- EVENT 3: [POP UP EXIST] IF USER DECLINES THE PROPOSAL
  - UPDATE THE Qs TABLE $Q_{OAP}(P < P_{t_0}(K'),K') = \beta Q_{OAP}(P < P_{t_0}(K'),K') - 1$
- EVENT 4: [POP UP NOT EXIST] ALGORITHM SWITCH AND SWITCH BACK WITHIN TIME T
  - UPDATE THE Qs TABLE $Q_{OAP}(P < P_{t_0}(K'),K') = \beta Q_{OAP}(P < P_{t_0}(K'),K') - 1$
- EVENT5: IF UE MANUALLY SWITCHES TO AAP/LTE K':
  - IF K' IS LTE:
    - IF $K' \notin A_j$, ADDK' TO $A_j$, ADD A NEW COLUMN OF ZEROS WITH SIZE OF |P| TO $Q_{OAP}$
    - IF $K' \in A_j, Q_{OAP}(P > P_{t_0}(K'),K') = \beta Q_{OAP}(P > P_{t_0}(K'),K') + 1$
  - IF K' IS AAP:
    - IF $K' \notin A_j$, ADDK' TO $A_j$, ADD THE CHANNEL OF K' TO $C_j$, ADD A NEW COLUMN OF ZEROS WITH SIZE OF |P|TO $Q_{OAP}$
    - IF $K' \in A_j, Q_{OAP}(P > P_{t_0}(K'),K') = \beta Q_{OAP}(P > P_{t_0}(K'),K') + 1$

END

The algorithm as shown in TABLE 2 can be further divided into the following processes: algorithm decision process, user decision process, user manually switch process, device automatically disconnected process.

Operational Process.

In this process, the algorithm makes the decisions of channel scan and which OAP/LTE to switch based on the Q table. If the algorithm finds that based on the current measurement, i.e., state $(ID_{t_0}, M_{t_0}, P_{t_0}, L_{t_0})$, the value of channel scan is larger than the value of no action, then a partial channel scan may be triggered. After the channel scan, the best AP may be selected from the existing Q table. If the Q value of two Aps are the same, then the AP with the higher RSSI value may be selected.

If the Q value of AP and LTE are the same, then AP may be selected. If the Q value belongs to the exploration range, i.e., channel scan value is smaller than the no action value but larger than the no action value minus a threshold, then an exploration process may be triggered. This exploration stage is trying to explore a better option to further reduce the ambiguity. If the channel scan action value is too smaller, then the no-action table may be rewarded. Details of the process can be found in FIG. 21.

Figure 21:
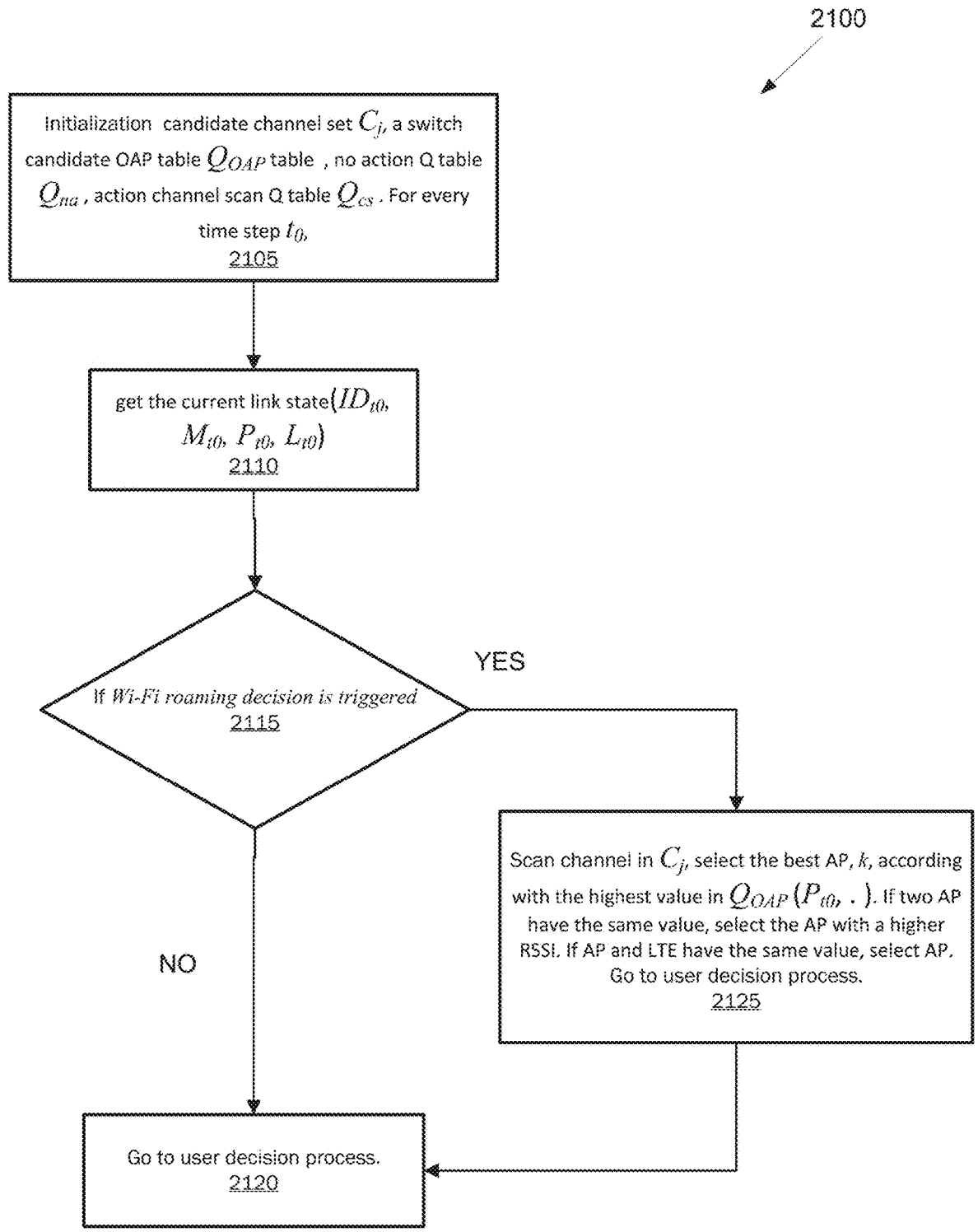
FIG. 21 illustrates a flow chart of a method for an algorithm decision according to embodiments of the present disclosure.

FIG. 21 illustrates a flow chart of a method 2100 for an algorithm decision according to embodiments of the present disclosure. The embodiment of the method 2100 illustrated in FIG. 21 is for illustration only. FIG. 21 does not limit the scope of the present disclosure to any particular implementation.

As illustrated in FIG. 21, the method 2100 in step 2105 initialize: candidate channel set $C_j$, a switch candidate OAP table $Q_{OAP}$ table, no action Q table $Q_{na}$, and action channel scan Q table $Q_{cs}$, for every time step $t_0$. In step 2110, the method 2100 gets the current link state $(ID_{t_0}, M_{t_0}, P_{t_0}, L_{t_0})$. In step 2115, the method 2100 determines if a Wi-Fi roaming decision is triggered. In step 2115, the Wi-Fi roaming decision is triggered, the method 2100 in step 2125 scans channel in $C_j$, selects the best AP, k, according with the highest value in $Q_{OAP}(P_{t_0}, .)$. In one embodiment, if two AP have the same value, the method 2100 selects the AP with a higher RSSI. In another embodiment, if AP and LTE have the same value, the method 2100 selects the AP. In step 2125, the method further goes to user decision process. In step 2115, if not triggered, the method 2100 goes to user decision process.

User Decision Process.

The next process is the user decision process. This process deals with the user decisions based on the algorithm proposal. After the algorithm provides the candidate AP to switch to, user may accept this recommendation or decline this recommendation according to different user preference. If the user accepts this proposal/recommendation, a positive reward may be added to the current channel scan table and OAP selection table. Otherwise, a negative reward may be added to the channels scan table and AP selection table.

Figure 22:
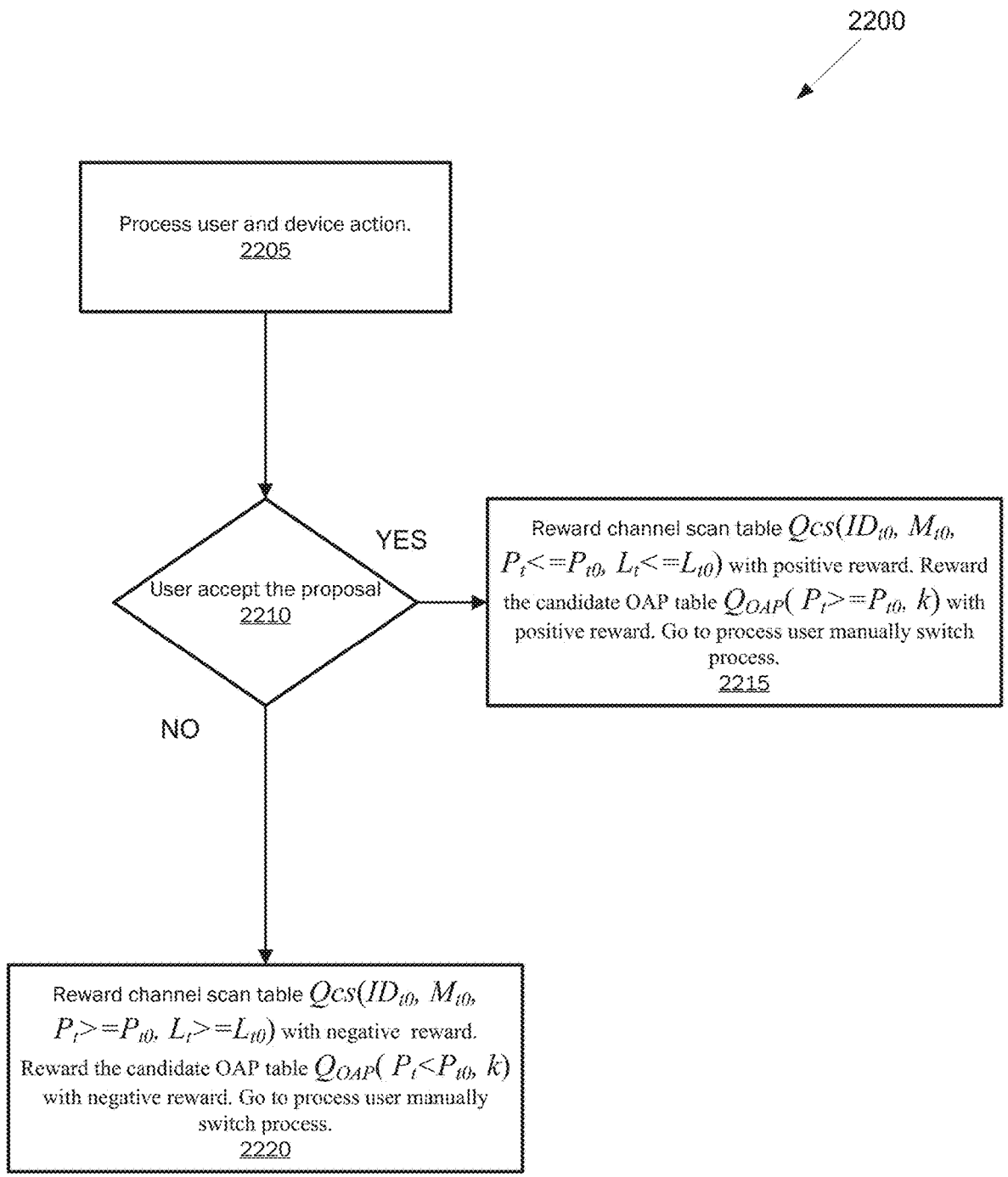
FIG. 22 illustrates a flow chart of a method for a user decision according to embodiments of the present disclosure.

FIG. 22 illustrates a flow chart of a method 2200 for a user decision according to embodiments of the present disclosure. The embodiment of the method 2200 illustrated in FIG. 22 is for illustration only. FIG. 22 does not limit the scope of the present disclosure to any particular implementation.

As illustrated in FIG. 22, the method 2200 processes user and device action in step 2205. In step 2210, the method 2200 determines if an user accepts the proposal. The user accepts the proposal in step 2210, the method in step 2215 rewards channel scan table $Qcs(ID_{r0}, M_{r0}, P_t<=P_{r0}, L_t<=L_{r0})$ with positive reward and rewards the candidate OAP table $Q_{OAP}(P_t>=P_{r0}, k)$ with positive reward. In step 2215, the method 2200 further goes to process user manually switch process. In step 2210, the user does not accept the proposal, the method in step 2220 rewards channel scan table Qcs $(ID_{r0}, M_{r0}, P_t>=P_{r0}, L_t>=L_{r0})$ with negative reward and rewards the candidate OAP table $Q_{OAP}(P_t<P_{r0}, k)$ with negative reward. In step 2220, the method further goes to process user manually switch process.

User Manually Switch Process.

After the user decision process, the algorithm may go to the user manually switch process. If the user manually switches to an OAP/LTE, then apart from rewarding the channel scan and OAP selection table. The algorithm may also add the switched OAP to the OAP list and the OAP's channel to the candidate partial channel scan list. So that, next time the algorithm would select this OAP to switch to according to the Q table.

Figure 23:
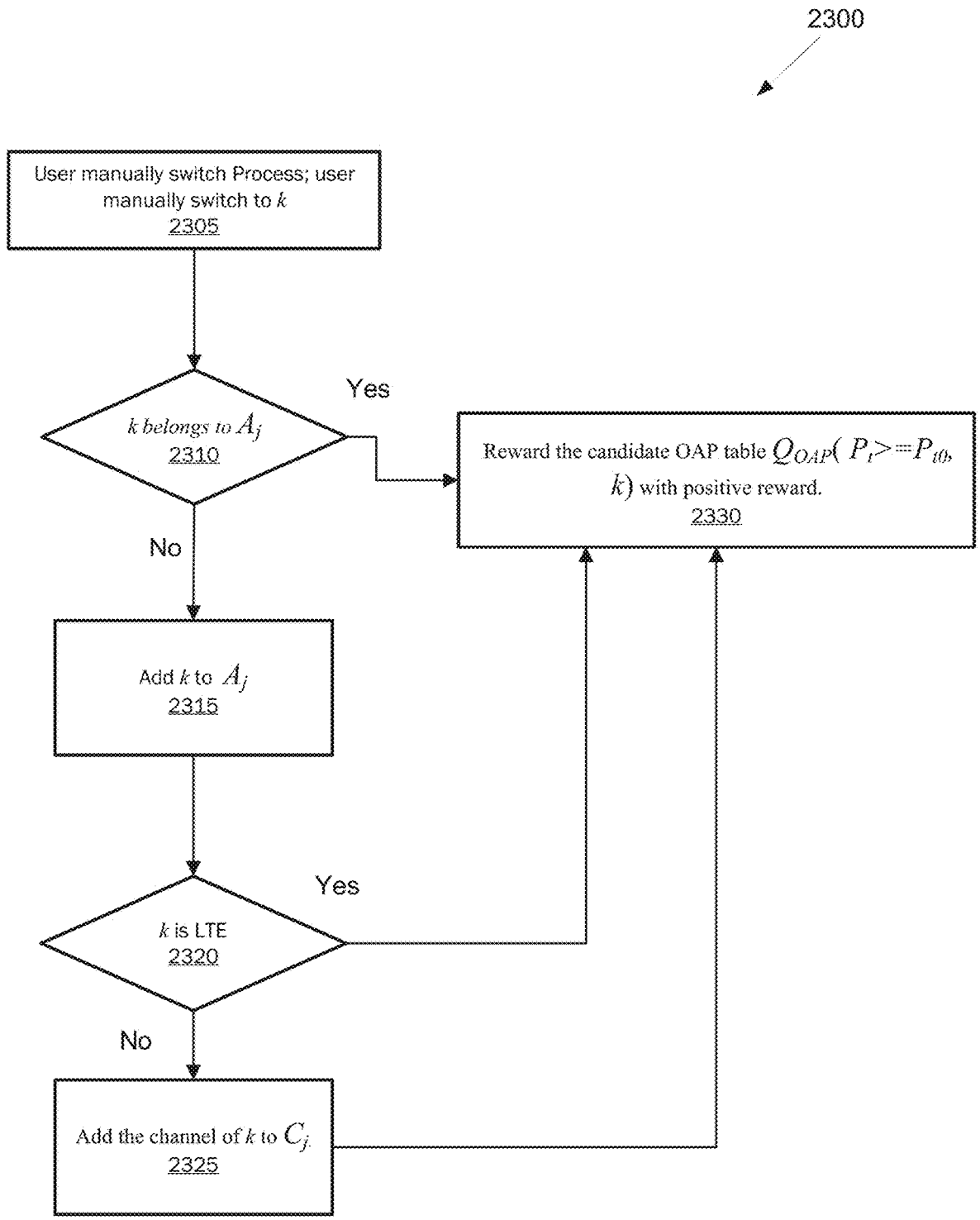
FIG. 23 illustrates a flow chart of a method foe a user manual switch according to embodiments of the present disclosure.

FIG. 23 illustrates a flow chart of a method 2300 for a user manual switch according to embodiments of the present disclosure. The embodiment of the method 2300 illustrated in FIG. 23 is for illustration only. FIG. 23 does not limit the scope of the present disclosure to any particular implementation.

As illustrated in FIG. 23, the method 2300 in step 2305 perform a user manually switch process (e.g., a user manually switches to k). In step 2310, the method 2300 determines k belongs to $A_j$. In step 2310, if belonging to $A_j$, the method in step 2330 rewards the candidate OAP table $Q_{OAP}(P_t>=P_{r0}, k)$ with positive reward. In step 2310, if not belonging to $A_j$, the method in 2315 adds k to $A_j$. The method 2300 in step 2320 determines k is LTE. If the k is LTE in step 2320, the method 2300 performs step 2330. If k is not LTE in step 2320, the method adds the channel of k to $C_j$. And then the method performs step 2330.

Scenario Based Wi-Fi Roaming.

Another embodiment of the present disclosure is a scenario-based Wi-Fi roaming. In such embodiment, the device may first learn or identify a scenario and then starts the scenario-specific Wi-Fi-roaming method. One example of this embodiment is that the device may use a neural network to identify the scenario of this device, if the scenario is "home," then the device may use a home specific Wi-Fi roaming method.

In one example of the home-specific scheme, the device may load the tables in the previous embodiment learned for home. In this case, the training time can be reduced as the device is just to load existing tables. In order to identify the scenario of the device, LQCM and/or throughput, and/or number of beacon loss, and/or number of NAK received, and/or BLER, and/or MCS values, and/or GPS, and/or pedometer could be the input of the neural network.

Figure 24:
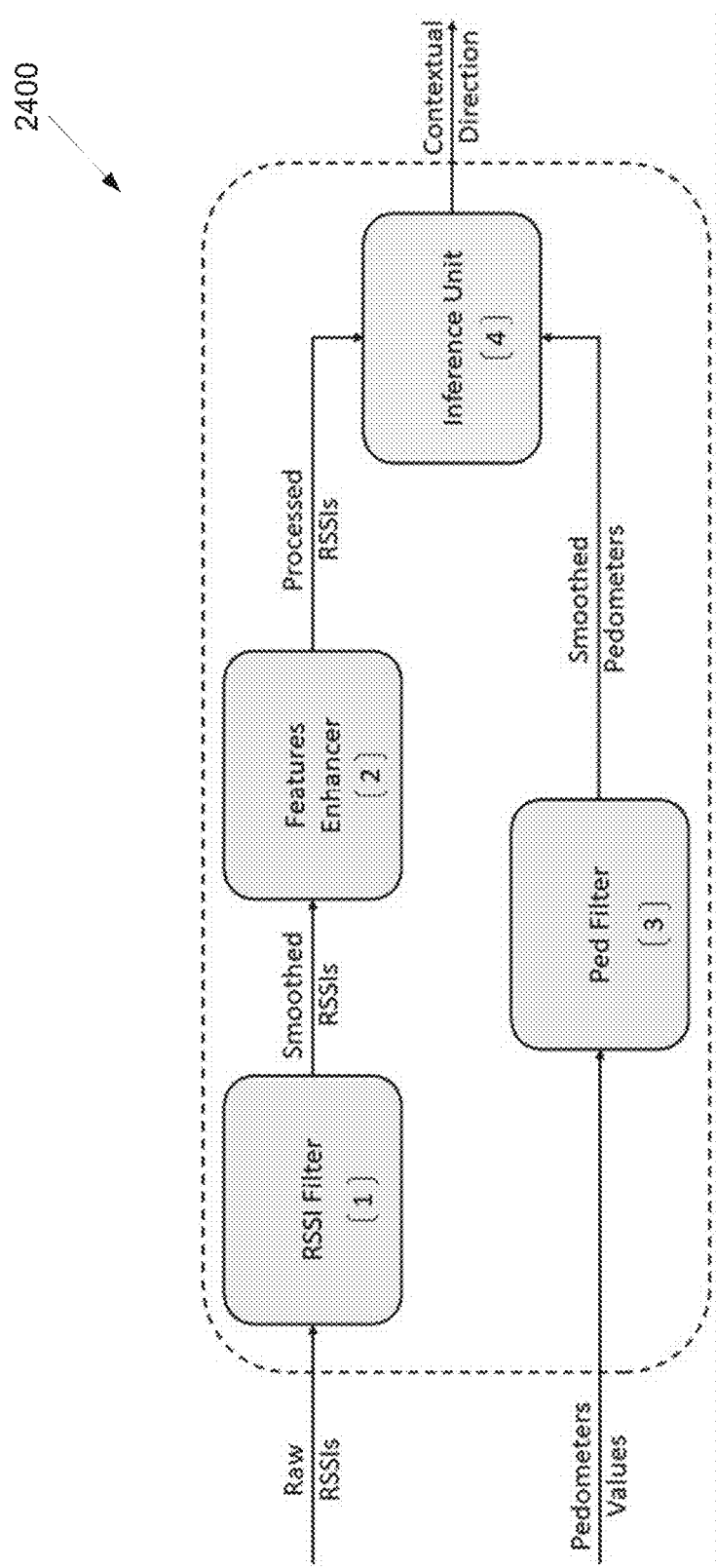
FIG. 24 illustrates an example direction engine pipeline according to embodiments of the present disclosure.

FIG. 24 illustrates an example direction engine pipeline 2400 according to embodiments of the present disclosure. The embodiment of direction engine pipeline 2400 illustrated in FIG. 24 is for illustration only. FIG. 24 does not limit the scope of the present disclosure to any particular implementation.

In one embodiment of main direction engine architecture, the structure of the architecture could be a pipeline which consists of four main components as shown in FIG. 24. As illustrated in FIG. 24, in step 1, the preprocessor could be a RSSI digital filter to smooth noisy RSSI sequences. In step 2, the second component could be a feature enhancer to improve the visibility of the RSSI sequences. In one example, the feature enhancer could be designed to remove the mean value. In step 3, the third component could be another digital filter to de-noise pedometers measurements. In step 4, the last component could be the inference unit which is the main component of the DE.

Figure 25:
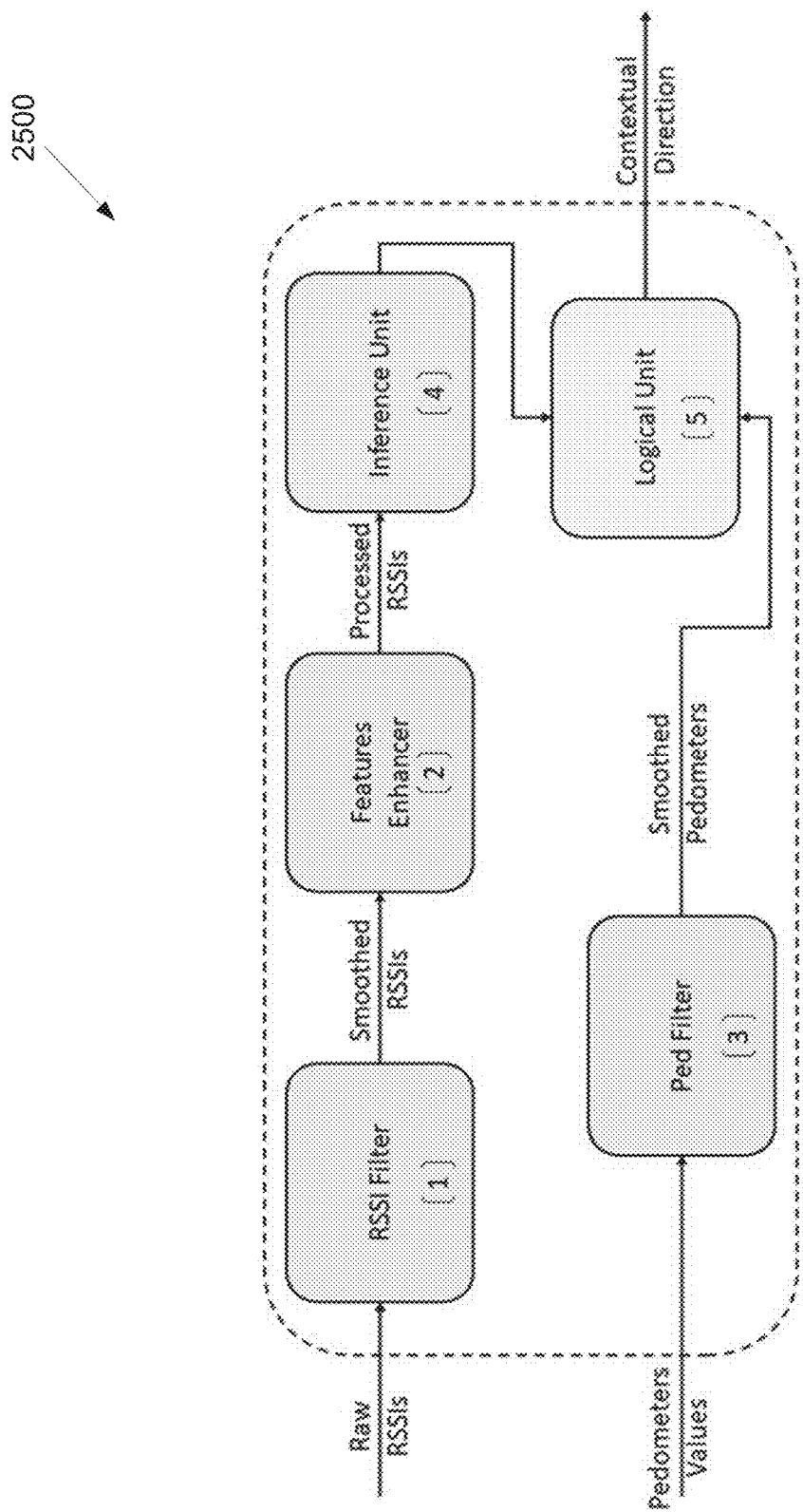
FIG. 25 illustrates an example direction engine pipeline according to embodiments of the present disclosure.

FIG. 25 illustrates an example direction engine pipeline 2500 according to embodiments of the present disclosure. The embodiment of the direction engine pipeline 2500 illustrated in FIG. 25 is for illustration only. FIG. 25 does not limit the scope of the present disclosure to any particular implementation.

As illustrated in FIG. 25, the alternative architecture comprises all four components the main architecture has with the exception of one additional component which is the logical unit and the alternative architecture has a different data flow design as shown in FIG. 24.

As illustrated in FIG. 25, instead of going into the inference unit (4th component in step 4) as in the main architecture, the data flow from the ped filter (3rd component in step 3) now is directed to the logical unit (5th component in step 5). The output of the inference unit also goes to the logical unit.

Figure 26:
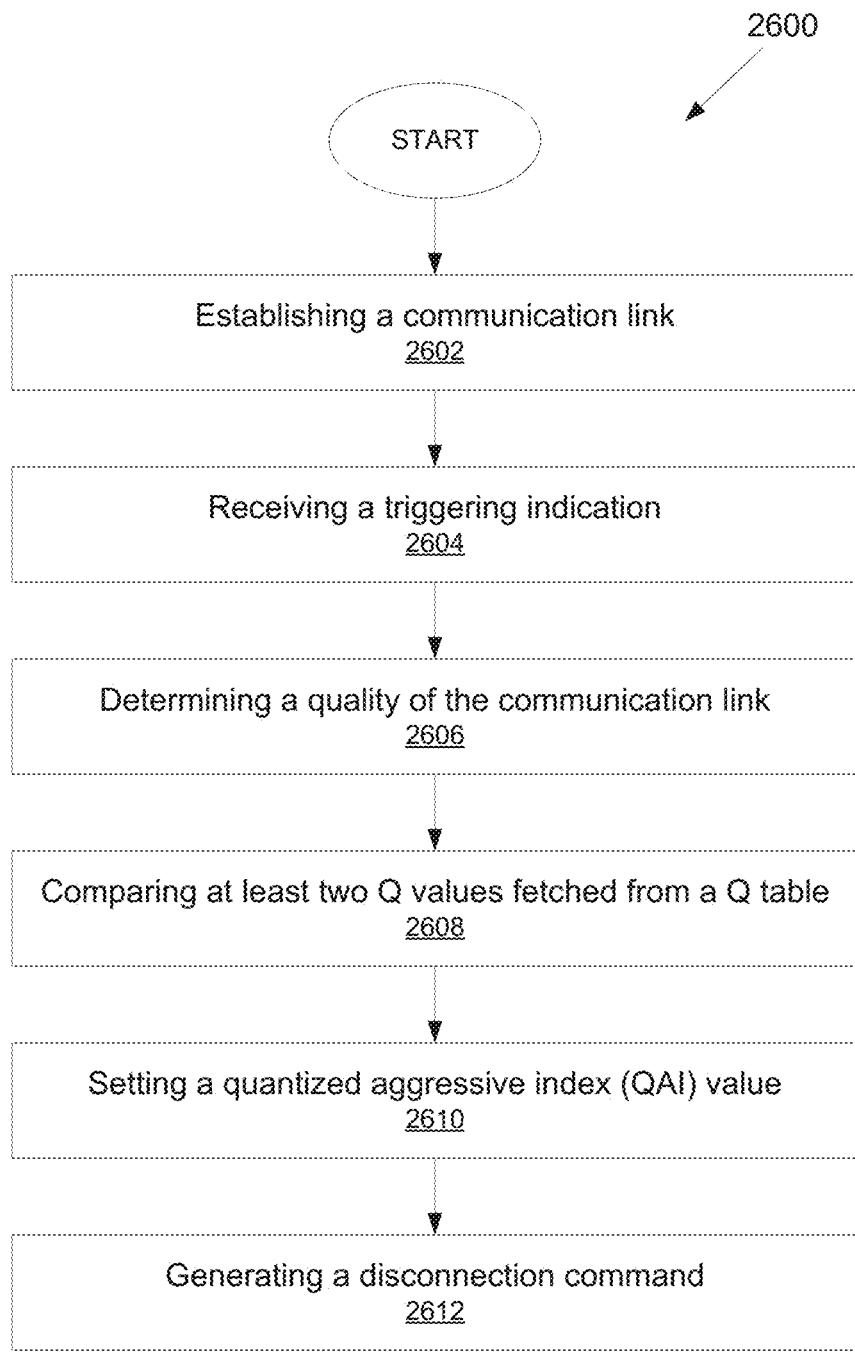
FIG. 26 illustrated a flow chart of a method for a connection management according to embodiment of the present disclosure.

FIG. 26 illustrated a flow chart of a method 2600 for a connection management according to embodiment of the present disclosure, as may be performed by an electronic device. The embodiment of the method 2600 illustrated in FIG. 26 is for illustration only. FIG. 26 does not limit the scope of the present disclosure to any particular implementation.

As illustrated in FIG. 26, the method 2600 begins at step 2602. In step 2602, the electronic device establishes a communication link with an access point (AP).

In step 2604, the electronic device receives a triggering indication based on link information measured by the electronic device.

In step 2606, the electronic device determines a quality of the communication link between the electronic device and the AP based on the received triggering indication.

In step 2608, the electronic device compares, based on the determined quality of the communication link, at least two Q values fetched from a Q table that is determined according to context in which in the electronic device is being used;

In step 2608, the Q table is determined by:

$$Q_{c,n+1}(s) = \alpha_1 Q_{c,n}(s) + \gamma R_e(s), s = 1, 2, \ldots, I_Q$$

$$R_e(s) = \begin{cases} R_e \beta^{s-s_0-1}, s > s_0 \text{ and } s_0 < I_Q \text{ at } L \text{ event} \\ R_e, s = I_Q \text{ and } s_0 = I_Q \text{ at } L \text{ event} \\ R_e \beta^{s_0-s-1}, s < s_0 \text{ and } s_0 > 1 \text{ at } M \text{ event} \\ R_e, s = 1 \text{ and } s_0 = 1 \text{ at } M \text{ event} \\ 0, \text{ else} \end{cases}$$

where $Q_{c,n}(s)$ is used to represent a Q value of state s at the Q table for context c, s is an index of state corresponding to a QAI level, c is an index of context, n is an event sequence, $\alpha_1$ is a learning rate in a time domain for an M or an L event, $\gamma$ is a reward discount factor, $\beta$ is a reward discount factor, $R_e(s)$ is rewards at a state s for an event e, $R_e$ is a reward value of the event e that is a predefined value for each event, and $s_0$ is a current state or a QAI value, and wherein, for the M and L events, all entries in the Q table for context c are updated.

In step 2610, the electronic device sets a quantized aggressive index (QAI) value based on the compared at least two Q values.

In step 2612, the electronic device generates a disconnection command based on the QAI value, wherein the disconnection command is a physical disconnection command or a virtual disconnection command of the communication link between the electronic device and the AP.

In step 2612, the physical disconnection command comprises an M event including: disconnecting a WiFi connection at an edge region; switching the WiFi connection from an access point (AP) to another AP at the edge region; turning off the WiFi connection at the edge region; turning on an aggressive setting or turning off a conservative setting; and setting an event that indicates more aggressive setting than the turned on aggressive setting.

In step 2612, the physical disconnection command further comprises an L event including: turning off a cellular data service at the edge region; disconnecting the WiFi connection and manually reconnecting the WiFi connection to the AP that is a same AP connected previously; disconnecting the WiFi connection within a specific time; turning off the aggressive setting or turning on the conservative setting; and setting the event that indicates less aggressive setting than the turned off aggressive setting.

In step 2612, the physical disconnection command further comprises an N event including: disconnecting the WiFi connection after maintaining the specific time; and maintaining the WiFi connection.

In step 2612, the physical disconnection command further comprises an S event including: turning on the WiFi connection when the electronic device is in a flight mode; and turning off the cellular data service at a non-edge region.

In step 2612, the virtual disconnection command comprises an M event including: disconnecting a WiFi connection at an edge region or when a switching flag is on; switching the WiFi connection from an access point (AP) to another AP at the edge region while the switching flag is off; turning off the WiFi connection at the edge region or when the switching flag is on; turning on an aggressive setting or turning off a conservative setting; and setting an event that indicates more aggressive setting than the turned on aggressive setting.

In step 2612, the virtual disconnection command comprises an L event including: turning off a cellular data service at the edge region or when the switching flag is off; disconnecting the WiFi connection and manually reconnecting the WiFi connection to the AP that is a same AP connected previously; disconnecting the WiFi connection within a specific time; turning off the aggressive setting or turning on the conservative setting; and setting the event that indicates less aggressive setting than the turned off aggressive setting.

In step 2612, the virtual disconnection command comprises an N event including: disconnecting the WiFi connection after maintaining the specific time; and maintaining the WiFi connection.

In step 2612, the virtual disconnection command comprises an S event including: turning on the WiFi connection when the electronic device is in a flight mode; turning off the cellular data service at a non-edge region; and turning off the WiFi connection when the electronic device is in an elevator and a door of the elevator is closed.

In one embodiment, the electronic device in the method 2600 further counts a number of bad transmit (Tx) packets in one second to identify the triggering indication, wherein each of bad Tx packets comprise a lower signal-to-noise ratio (SINR) than a threshold.

In another embodiment, the electronic device in the method 2600 further compares the number of bad Tx packets with a pre-defined threshold (Nb).

In yet another embodiment, the electronic device in the method 2600 further determines the triggering indication as a good link or a bad link based on a result of the comparison.

In yet another embodiment, the electronic device in the method 2600 further generates the QAI value based on quantizing a number of triggering indications that is generated consecutively.

In yet another embodiment, the electronic device processes the Q table based on the context; identifies the set QAI value based on the Q table; writes the set QAI value into a memory for a connection management performing a WiFi connection; and configures the set QAI value as a true value.

In yet another embodiment, the electronic device performs a steady state checking (SSC) function based on a history of events including an M event, an L event, an N event, and an S event; generates an SSC triggering event based on the performed SSC function; and updates the Q table based on the generated SSC triggering event.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. An apparatus for a connection management of an electronic device, the apparatus comprising:
   a transceiver configured to establish a communication link with an access point (AP); and
   a processor operably connected to the transceiver, the processor configured to:

receive a triggering indication based on link information measured by the electronic device;
determine a quality of the communication link between the electronic device and the AP based on the received triggering indication;
compare, based on the determined quality of the communication link, at least two Q values fetched from a Q table that is determined according to context in which in the electronic device is being used;
set a quantized aggressive index (QAI) value based on the compared at least two Q values; and
generate a disconnection command based on the QAI value, wherein the disconnection command is a physical disconnection command or a virtual disconnection command of the communication link between the electronic device and the AP.

2. The apparatus of claim 1, wherein the processor is further configured to:
count a number of bad transmit (Tx) packets in one second to identify the triggering indication, wherein each of bad Tx packets comprise a lower signal-to-noise ratio (SINR) than a threshold;
compare the number of bad Tx packets with a pre-defined threshold (Nb); and
determine the triggering indication as a good link or a bad link based on a result of the comparison.

3. The apparatus of claim 1, wherein the processor is further configured to generate the QAI value based on quantizing a number of triggering indications that is generated consecutively.

4. The apparatus of claim 1, wherein the physical disconnection command comprises:
an M event including:
disconnecting a WiFi connection at an edge region,
switching the WiFi connection from an access point (AP) to another AP at the edge region,
turning off the WiFi connection at the edge region,
turning on an aggressive setting or turning off a conservative setting, and
setting an event that indicates more aggressive setting than the turned on aggressive setting;
an L event including:
turning off a cellular data service at the edge region,
disconnecting the WiFi connection and manually reconnecting the WiFi connection to the AP that is a same AP connected previously,
disconnecting the WiFi connection within a specific time,
turning off the aggressive setting or turning on the conservative setting, and
setting the event that indicates less aggressive setting than the turned off aggressive setting;
an N event including:
disconnecting the WiFi connection after maintaining the specific time, and
maintaining the WiFi connection; and
an S event including:
turning on the WiFi connection when the electronic device is in a flight mode; and
turning off the cellular data service at a non-edge region.

5. The apparatus of claim 1, wherein the virtual disconnection command comprises:
an M event including:
disconnecting a WiFi connection at an edge region or when a switching flag is on,
switching the WiFi connection from an access point (AP) to another AP at the edge region while the switching flag is off,
turning off the WiFi connection at the edge region or when the switching flag is on,
turning on an aggressive setting or turning off a conservative setting, and
setting an event that indicates more aggressive setting than the turned on aggressive setting;
an L event including:
turning off a cellular data service at the edge region or when the switching flag is off,
disconnecting the WiFi connection and manually reconnecting the WiFi connection to the AP that is a same AP connected previously,
disconnecting the WiFi connection within a specific time,
turning off the aggressive setting or turning on the conservative setting,
setting the event that indicates less aggressive setting than the turned off aggressive setting;
an N event including:
disconnecting the WiFi connection after maintaining the specific time, and
maintaining the WiFi connection; and
an S event including:
turning on the WiFi connection when the electronic device is in a flight mode,
turning off the cellular data service at a non-edge region, and
turning off the WiFi connection when the electronic device is in an elevator and a door of the elevator is closed.

6. The apparatus of claim 1, wherein the Q table is determined by:

$$Q_{c,n+1}(s) = \alpha_1 Q_{c,n}(s) + \gamma R_e(s), s = 1, 2, \ldots, I_Q$$

$$R_e(s) = \begin{cases} R_e \beta^{s-s_0-1}, s > s_0 \text{ and } s_0 < I_Q \text{ at } L \text{ event} \\ R_e, s = I_Q \text{ and } s_0 = I_Q \text{ at } L \text{ event} \\ R_e \beta^{s_0-s-1}, s < s_0 \text{ and } s_0 > 1 \text{ at } M \text{ event} \\ R_e, s = 1 \text{ and } s_0 = 1 \text{ at } M \text{ event} \\ 0, \text{ else} \end{cases}$$

where $Q_{c,n}(s)$ is used to represent a Q value of state s at the Q table for context c, s is an index of state corresponding to a QAI level, c is an index of context, n is an event sequence, $\alpha_1$ is a learning rate in a time domain for an M or an L event, $\gamma$ is a reward discount factor, $\beta$ is a reward discount factor, $R_e(s)$ is rewards at a state s for an event e, $R_e$ is a reward value of the event e that is a predefined value for each event, and $s_0$ is a current state or a QAI value, and
wherein, for the M and L events, all entries in the Q table for context c are updated.

7. The apparatus of claim 1, wherein the processor is further configured to:
process the Q table based on the context;
identify the set QAI value based on the Q table;
write the set QAI value into a memory for a connection management performing a WiFi connection; and
configure the set QAI value as a true value.

8. The apparatus of claim 1, wherein the processor is further configured to:
perform a steady state checking (SSC) function based on a history of events including an M event, an L event, an N event, and an S event;
generate an SSC triggering event based on the performed SSC function; and
update the Q table based on the generated SSC triggering event.

9. A method of an electronic device for a connection management, the method comprising:
establishing a communication link with an access point (AP);
receiving a triggering indication based on link information measured by the electronic device;
determining a quality of the communication link between the electronic device and the AP based on the received triggering indication;
comparing, based on the determined quality of the communication link, at least two Q values fetched from a Q table that is determined according to context in which in the electronic device is being used;
setting a quantized aggressive index (QAI) value based on the compared at least two Q values; and
generating a disconnection command based on the QAI value, wherein the disconnection command is a physical disconnection command or a virtual disconnection command of the communication link between the electronic device and the AP.

10. The method of claim 9, further comprising:
counting a number of bad transmit (Tx) packets in one second to identify the triggering indication, wherein each of bad Tx packets comprise a lower signal-to-noise ratio (SINR) than a threshold;
comparing the number of bad Tx packets with a predefined threshold (Nb); and
determining the triggering indication as a good link or a bad link based on a result of the comparison.

11. The method of claim 9, further comprising generating the QAI value based on quantizing a number of triggering indications that is generated consecutively.

12. The method of claim 9, wherein the physical disconnection command comprises:
an M event including:
disconnecting a WiFi connection at an edge region,
switching the WiFi connection from an access point (AP) to another AP at the edge region,
turning off the WiFi connection at the edge region,
turning on an aggressive setting or turning off a conservative setting, and
setting an event that indicates more aggressive setting than the turned on aggressive setting;
an L event including:
turning off a cellular data service at the edge region,
disconnecting the WiFi connection and manually reconnecting the WiFi connection to the AP that is a same AP connected previously,
disconnecting the WiFi connection within a specific time,
turning off the aggressive setting or turning on the conservative setting, and
setting the event that indicates less aggressive setting than the turned off aggressive setting;
an N event including:
disconnecting the WiFi connection after maintaining the specific time, and
maintaining the WiFi connection; and
an S event including:
turning on the WiFi connection when the electronic device is in a flight mode; and
turning off the cellular data service at a non-edge region.

13. The method of claim 9, wherein the virtual disconnection command comprises:
an M event including:
disconnecting a WiFi connection at an edge region or when a switching flag is on,
switching the WiFi connection from an access point (AP) to another AP at the edge region while the switching flag is off,
turning off the WiFi connection at the edge region or when the switching flag is on,
turning on an aggressive setting or turning off a conservative setting, and
setting an event that indicates more aggressive setting than the turned on aggressive setting;
an L event including:
turning off a cellular data service at the edge region or when the switching flag is off,
disconnecting the WiFi connection and manually reconnecting the WiFi connection to the AP that is a same AP connected previously,
disconnecting the WiFi connection within a specific time,
turning off the aggressive setting or turning on the conservative setting,
setting the event that indicates less aggressive setting than the turned off aggressive setting;
an N event including:
disconnecting the WiFi connection after maintaining the specific time, and
maintaining the WiFi connection; and
an S event including:
turning on the WiFi connection when the electronic device is in a flight mode,
turning off the cellular data service at a non-edge region, and
turning off the WiFi connection when the electronic device is in an elevator and a door of the elevator is closed.

14. The method of claim 9, wherein the Q table is determined by:

$$Q_{c,n+1}(s) = \alpha_1 Q_{c,n}(s) + \gamma R_e(s), s = 1, 2, \ldots, I_Q$$

$$R_e(s) = \begin{cases} R_e \beta^{s-s_0-1}, s > s_0 \text{ and } s_0 < I_Q \text{ at } L \text{ event} \\ R_e, s = I_Q \text{ and } s_0 = I_Q \text{ at } L \text{ event} \\ R_e \beta^{s_0-s-1}, s < s_0 \text{ and } s_0 > 1 \text{ at } M \text{ event} \\ R_e, s = 1 \text{ and } s_0 = 1 \text{ at } M \text{ event} \\ 0, \text{ else} \end{cases}$$

where $Q_{c,n}(s)$ is used to represent a Q value of state s at the Q table for context c, s is an index of state corresponding to a QAI level, c is an index of context, n is an event sequence, $\alpha_1$ is a learning rate in a time domain for an M or an L event, $\gamma$ is a reward discount factor, $\beta$ is a reward discount factor, $R_e(s)$ is rewards at a state s for an event e, $R_e$ is a reward value of the event e that is a predefined value for each event, and $s_0$ is a current state or a QAI value, and wherein, for the M and L events, all entries in the Q table for context c are updated.

15. The method of claim 9, further comprising:
processing the Q table based on the context;
identifying the set QAI value based on the Q table;
writing the set QAI value into a memory for a connection management performing a WiFi connection; and
configuring the set QAI value as a true value.

16. The method of claim 9, further comprising:
performing a steady state checking (SSC) function based on a history of events including an M event, an L event, an N event, and an S event;
generating an SSC triggering event based on the performed SSC function; and
updating the Q table based on the generated SSC triggering event.

17. A non-transitory computer-readable medium comprising program code, that when executed by at least one processor, causes an electronic device to:
establish a communication link with an access point (AP);
receive a triggering indication based on link information measured by the electronic device;
determine a quality of the communication link between the electronic device and the AP based on the received triggering indication;
compare, based on the determined quality of the communication link, at least two Q values fetched from a Q table that is determined according to context in which in the electronic device is being used;
set a quantized aggressive index (QAI) value based on the compared at least two Q values; and
generate a disconnection command based on the QAI value, wherein the disconnection command is a physical disconnection command or a virtual disconnection command of the communication link between the electronic device and the AP.

18. The computer-readable medium of claim 17, further comprising program code, that when executed by at least one processor, causes the electronic device to:
count a number of bad transmit (Tx) packets in one second to identify the triggering indication, wherein each of bad Tx packets comprise a lower signal-to-noise ratio (SINR) than a threshold;
compare the number of bad Tx packets with a pre-defined threshold (Nb); and
determine the triggering indication as a good link or a bad link based on a result of the comparison.

19. The computer-readable medium of claim 17, further comprising program code, that when executed by at least one processor, causes the electronic device to generate the QAI value based on quantizing a number of triggering indications that is generated consecutively.

20. The computer-readable medium of claim 17, wherein the physical disconnection command comprises:
an M event including:
  disconnecting a WiFi connection at an edge region,
  switching the WiFi connection from an access point (AP) to another AP at the edge region,
  turning off the WiFi connection at the edge region,
  turning on an aggressive setting or turning off a conservative setting, and
  setting an event that indicates more aggressive setting than the turned on aggressive setting;
an L event including:
  turning off a cellular data service at the edge region,
  disconnecting the WiFi connection and manually reconnecting the WiFi connection to the AP that is a same AP connected previously,
  disconnecting the WiFi connection within a specific time,
  turning off the aggressive setting or turning on the conservative setting, and
  setting the event that indicates less aggressive setting than the turned off aggressive setting;
an N event including:
  disconnecting the WiFi connection after maintaining the specific time, and
  maintaining the WiFi connection; and
an S event including:
  turning on the WiFi connection when the electronic device is in a flight mode; and
  turning off the cellular data service at a non-edge region.

* * * * *